United States Patent
Kuturianu et al.

(10) Patent No.: US 7,366,955 B2
(45) Date of Patent: Apr. 29, 2008

(54) AUTOMATED TEST EXECUTION FRAMEWORK WITH CENTRAL MANAGEMENT

(75) Inventors: Olga Kuturianu, Bat Yam (IL); Victor Rosenman, Tel Aviv (IL)

(73) Assignee: Sun Microsystems, Inc., Santa Clara, CA (US)

( * ) Notice: Subject to any disclaimer, the term of this patent is extended or adjusted under 35 U.S.C. 154(b) by 735 days.

(21) Appl. No.: 10/767,849

(22) Filed: Jan. 29, 2004

(65) Prior Publication Data
US 2004/0243381 A1    Dec. 2, 2004

Related U.S. Application Data

(60) Provisional application No. 60/443,794, filed on Jan. 29, 2003, provisional application No. 60/443,795, filed on Jan. 29, 2003.

(51) Int. Cl.
*G06F 11/00* (2006.01)

(52) U.S. Cl. .................. 714/38; 714/25; 714/27; 714/37

(58) Field of Classification Search .......... 714/25, 714/27, 37, 38
See application file for complete search history.

(56) References Cited

U.S. PATENT DOCUMENTS

| | | | |
|---|---|---|---|
| 5,922,079 A | 7/1999 | Booth et al. | |
| 6,002,868 A | 12/1999 | Jenkins et al. | |
| 6,167,352 A | 12/2000 | Kanevsky et al. | |
| 6,219,829 B1 | 4/2001 | Sivakumar et al. | |
| 6,311,149 B1 | 10/2001 | Ryan et al. | |
| 6,378,088 B1 | 4/2002 | Mongan | |
| 6,385,741 B1 | 5/2002 | Nakamura | |
| 6,393,591 B1 | 5/2002 | Jenkins, IV et al. | |
| 6,397,378 B1 | 5/2002 | Grey et al. | |
| 6,449,731 B1 | 9/2002 | Frey, Jr. | |
| 6,560,721 B1 | 5/2003 | Boardman et al. | |
| 6,708,324 B1 | 3/2004 | Solloway et al. | |
| 6,839,647 B2 | 1/2005 | Volkov et al. | |
| 6,847,916 B1 | 1/2005 | Ying | |
| 6,868,508 B2 | 3/2005 | Grey | |
| 7,055,067 B2 * | 5/2006 | DiJoseph ............ | 714/38 |
| 2001/0053961 A1 | 12/2001 | Liu et al. | |
| 2001/0054161 A1 | 12/2001 | Wooddruff | |
| 2002/0133749 A1 | 9/2002 | Petersen et al. | |
| 2003/0131285 A1 * | 7/2003 | Beardsley et al. ........ | 714/38 |

OTHER PUBLICATIONS

U.S. Appl. No. 10/767,858, filed Jan. 29, 2004.

(Continued)

*Primary Examiner*—Robert Beausoliel
*Assistant Examiner*—Charles Ehne
(74) *Attorney, Agent, or Firm*—Meyertons Hood Kivlin Kowert & Goetzel, P.C.

(57) ABSTRACT

A test execution system has a central repository that contains a management unit, available test suites and a single test execution harness. Using the management unit, a system administrator establishes active versions of the various test suites, and their individual configurations. End users install clients of the central repository, using a system-provided installer program. In the client, an execution script is created, which downloads the harness and a local configuration file. Then, when the harness is executed at the client, it loads with all designated test suites already installed, configured and ready for execution. The client always has the most current versions of all test suites. All necessary information is obtained from a single central location.

25 Claims, 56 Drawing Sheets

OTHER PUBLICATIONS

U.S. Appl. No. 10/767,845, filed Jan. 29, 2004.
U.S. Appl. No. 10/767,851, filed Jan. 29, 2004.
U.S. Appl. No. 10/767,848, filed Jan. 29, 2004.
U.S. Appl. No. 10/767,846, filed Jan. 29, 2004.

* cited by examiner

Fig. 5

| 5AA | 5AB | 5AC | 5AD | 5AE | 5AF | 5AG | 5AH | 5AI | 5AJ |
|-----|-----|-----|-----|-----|-----|-----|-----|-----|-----|
| 5BA | 5BB | 5BC | 5BD | 5BE | 5BF | 5BG | 5BH | 5BI | 5BJ |
| 5CA | 5CB | 5CC | 5CD | 5CE | 5CF | 5CG | 5CH | 5CI | 5CJ |
|     |     | 5DC | 5DD | 5DE | 5DF | 5DG | 5DH | 5DI | 5DJ |
|     |     | 5EC | 5ED | 5EE | 5EF | 5EG | 5EH |     |     |
|     |     | 5FC | 5FD | 5FE | 5FF | 5FG | 5FH |     |     |
|     |     |     |     |     |     | 5GG | 5GH |     |     |

| | |
|---|---|
| searchTestSuiteName(ls:LinkedLis | -initializeViews(sessionAccess:Ses |
| +addListener(l:TestSuitesManager — 190 | +isPlatformUpdated(number:String |
| +addListener(l:SessionListener):vc   370 → | +hasConflicts():boolean |
| +removeListener(l:TestSuitesMana — 192   376 → | +notifyListeners(event:SessionEvei |
| +fireEvent(event:TestSuitesManage — 194   356 → | +addListener(listener:SessionListe |
| +registerTestSuite(props:Propertie   378 → | +save():void |
| -createRecords(props:Properties,ts   380 → | +saveResults():void |
| -createRecord(name:String,value:S | +save(types:String[],fName:String): |
| getcurrentTestSuite(name:String):TestSu — 188   372 → | +loadResults(defaultName:String): |
| +listOfTestSuiteNames():String[ — 200   374 → | +mergeResults(listOfResults:Obje |
| +notify(event:TestSuitesManagerEv   386 → | +update():void |
| +notifyListeners(event:SessionEvei — 202 | -MergeRequest |
| +removeTestSuite(name:String):vo — 204 | profileName:String |
| +updateTestSuite(suiteName:Strin | get sessionName:String |
| +addTestSuite(name:String,ts:Test — 206   364   | set sessionName:String — 384 |
| save():void — 208   358 → | get lplatform:Platform |
| +initialized():boolean   360   | get platformName:String |
| -ReadRequest   368   | set platformName:String — 382 |
| setrecordAdder:RecordAdder — 170   366 → | get view:GenericView[] |
| setrestoreTSM:TestSuitesManager — 172   362 → | get testSuitesManager:TestSuitesMan |
| getframeworkConfiguration:Framewo — 174 | get protectedSession:Session |
| get platformName:String — 178 | |
| set platformName:String — 196 | |
| setcurrentTestSuite:String — 186 | |
| fileName:String | |

Fig. 5BG

| | |
|---|---|
| | +DeveloperTestSuitesManager(pla |
| 260 | +readTestSuites(testSuites:Vector) |
| | setSessionParameters(sessionAc |
| | +registerTestSuites(parentManage |
| | -readFile(fileName:String):Propertie |
| | isTSUpdated(ts:LinkedList):boolea |
| | findNames(ls:LinkedList):void |
| 266 | searchTestSuiteName(ls:LinkedLis |
| | -copyInBackground(infoFile:String,c |
| | -isValidCopy(info:String,copy:String |
| | -createCopyThread(from:String,to:S |
| 252 | getXMLManager():XMLAccessMana |
| 236 | +addListener(l:TestSuitesManager |
| 234 | +addListener(l:SessionListener):vc |
| 262 | +removeListener(l:TestSuitesMana |
| 240 | +fireEvent(event:TestSuitesManage |
| 258 | +registerTestSuite(props:Propertie |
| | -createRecords(props:Properties,ts |
| | -createRecord(name:String,value:S |
| 250 | +getTestSuite(name:String):TestSu |
| 254 | +listOfTestSuiteNames():String[] |
| 255 | +notify(event:TestSuitesManagerEv |
| 256 | +notifyListeners(event:SessionEvel |
| 264 | +removeTestSuite(name:String):vo |

Fig. 5DG

664 +isSelected(name:String,tsName:S
662 #generateSelectedRecord(name:S
666 +performSelectTransaction(selecte
+isEmpty():boolean
636 +setFileName(fName:String):void 656 +isExcluded(nam
648 #generateExclude
658 +performExclude
+isEmpty():boole
638 +setPlatformNam
636 +setFileName(fN

```
ime:String,tsName:{    612  +save(query:SessionQuery):void         620    +getTable():Table
ideRecord(name:Str           +initialize(it:Iterator):void          626    +initialize(it:Iterator):void
leTransaction(exclu    610  +initialize(it:Iterator,view:GenericVie 630    +save(query:SessionQuery,fName:
lean                         +loadResults():void                    640    +setSelectedTests(it:Iterator):void
ime(name:String):vc          viewObject:View                        628    +prepareForTestExecution(query:S
fName:String):void     644   testsViewInfo:TestsViewInfo            634    +saveTestResult(testName:String,
                       640   selectedTests:Iterator                 632    +saveTestFailure(testName:String,
                       636   fileName:String                              -executionStatus(id:int):boolean
                             empty:boolean                          622    +getTestRecord(testPackage:String
                                                                    624    +getTestsViewInfo():TestsViewInfo
                                                                    618    +availableKeywords():HashSet
                                                                    616    +availableExecutionStatuses():Has
                                                                    636    +setFileName(fileN:String):void
                                                                          -removeUnprintableCharacters(log
                                                                    638    +setPlatformName(name:String):vc
```

|  |  |  |  |
|---|---|---|---|
| | +isPlatformUpdated(versionNumbe | -tsm:TestSuitesManager=null | -tsm:TestSt |
| 224 | +save():void | -read:boolean=false | -read:boole |
| 228 | +update():void | -manager:TestManager | -manager:T |
| 214 | get profileName:String | -config:FrameworkEnvironmentCor | -config:Frar |
| 216 | set platformName:String | -sessionAccess:SessionAccess | -sessionAc |
| 218 | get view:GenericView[] | -platformAccess:PlatformAccess | -platformAc |
| 476 | get testSuitesManager:TestSuitesMan | -namesVector:Vector | -namesVec |
| 222 | get protectedPlatform:Platform | -platformTsm:DefaultTestSuitesMa | +Developer |
| | | -sessionTsm:DefaultTestSuitesMa | 444 +createPlat |
| | | +DefaultSessionManager() | 460 +openPlatfc |
| | 444 | +createPlatform(platformName:Stri | 464 +savePlatfo |
| | 460 | +openPlatform(platformName:Strin | 466 +savePlatfo |
| | 464 | +savePlatform(platform:Platform):b | 446 +createSes |
| | 466 | +savePlatform(platform:Platform,pr | -installTest: |
| | 446 | +createSession(sessionName:Stri | 462 +openSess |
| | | -installTestSuite():void | 470 +saveSess |
| | 462 | +openSession(sessionName:Strin | |
| | 470 | +saveSession(session:Session):b | 456 +loadResul |
| | | | 468 +saveResu |
| | 456 | +loadResults(targetFile:String):Ses | 458 +mergeRes |
| | 468 | +saveResults(session:Session):bc | |
| | 458 | +mergeResults(listOfResults:Obje | 452 testSuitesN |
| | | -getAvailableFilesList(targetDir:Stri | 450 availableSe |
| | 452 | get testSuitesManager:TestSuitesMan | 448 availablePl |
| | 450 | get availableSessionNames:Vector | 454 UICompon |
| | 448 | get availablePlatformsNames:Vector | |
| | 454 | get UIComponent:TBComponentUI | |

Fig. 5FG

| | |
|---|---|
| ioolean=false<br>ger:TestManager<br>:FrameworkEnvironmentCor<br>ɔnAccess:SessionAccess<br>mAccess:PlatformAccess<br>sVector:Vector | totalTests:int=0<br>totalExecutedTests:int=0<br>-monitor:JProgressBar<br>-dialog:MonitorDialog<br>-serviceThread:Thread<br>-manager:TestManager<br>-commonlib:String<br>config:FrameworkEnvironmentCon<br>-envInitialzied:boolean=false<br>-tsmInitialized:boolean=false<br>-listeners:Vector=new Vector()<br>-hasConflicts:boolean=true<br>-prevSession:Session=null |
| operSessionManager()<br>ɘPlatform(platformName:Stri<br>ᴾlatform(platformName:Strin<br>ᴾlatform(platform:Platform,s:<br>ᴾlatform(platform:Platform):b<br>ɘSession(sessionName:Stri<br>TestSuite():void<br>ɜession(sessionName:Strin<br>ɜession(session:Session):b<br><br>ʔesults(targetFile:String):Seɛ<br>ʔesults(session:Session):bɾ<br>eResults(listOfResults:Obje<br>ɪilableFilesList(targetDir:Striɪ | +DefaultSession(pl:Platform,name<br>+DefaultSession(prevSession:Ses<br>-init(pl:Platform,name:String,sessiɕ<br>-initializeViews(sessionAccess:Seɛ<br>+isPlatformUpdated(number:String ⟵ 418<br>+hasConflicts():boolean ⟵ 416<br>-notEmpty(tables:AskTable[]):boole<br>+notifyListeners(event:SessionEvel ⟵ 424<br>+addListener(listener:SessionListɛ ⟵ 400<br>-showAskTables(t1:AskTable,t2:As<br>+save(s:String):void ⟵ 426<br>+save():void ⟵ 428 |
| itesManager:TestSuitesMan<br>ɔleSessionNames:Vector<br>ɔlePlatformsNames:Vector<br>ɪponent:TBComponentUI | |

Fig. 5FH

448 — get availablePlatformsNames:Vector
454 — get UIComponent:TBComponentUI

Fig. 5GG

```
                    +save():void ←── 428
430 ──→ +save(types:String[],fName:String):
            +loadResults(defaultName:String): ──→ 420
432 ──→ +saveResults():void
            +mergeResults(listOfResults:Obje ──→ 422
438 ──→ +update():void
            #TransactionRequest
            -MergeRequest
410 ──get  sessionName:String
436 ──set  setSessionName (name:String)
402 ──get  platform:Platform
404 ──get  platformName:String
434 ──set           (name:String)
414 ──get  view:GenericView[]
412 ──get  testSuitesManager:TestSuitesMan
408 ──get  protectedSession:Session
406 ──get  profileName:String
```

Fig. 5GH

AUTOMATED TEST EXECUTION FRAMEWORK WITH CENTRAL MANAGEMENT

CROSS-REFERENCE TO RELATED APPLICATIONS

This application claims the benefit of Provisional Application No. 60/443,794 Filed Jan. 29, 2003, entitled "Automated Test Execution Framework with Central Management".

This application is related to Provisional Application No. 60/443,795 Filed Jan. 29, 2003, entitled "Parallel Test Execution on Low-End Emulators and Devices".

BACKGROUND OF THE INVENTION

1. Field of the Invention

This invention relates to improvements in software and hardware design verification. More particularly, this invention relates to methods and systems for centrally managing the execution of multiple test suites on different platforms for verification of different hardware and software.

2. Description of the Related Art

The meanings of acronyms and certain terminology used herein are given in Table 1. The terms Sun, Sun Microsystems, Java, J2EE, J2ME, J2SE, and the Sun logo are trademarks or registered trademarks of Sun Microsystems, Inc., in the United States of America and other countries. All other company and product names may be trademarks of their respective companies. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TABLE 1

| | |
|---|---|
| API | Application programming interface |
| CLDC | Connected, limited device configuration. CLDC is suitable for devices with 16/32-bit RISC/CISC microprocessors/controllers, having as little as 160 KB of total memory available. |
| HTML | Hypertext markup language |
| J2EE | Java 2 Enterprise Edition |
| J2ME | Java 2 Micro Edition |
| J2SE | Java 2 Standard Edition |
| JAD | Java application descriptor |
| JAR | Java archive |
| MIDlet | A MIDP application |
| MIDP | Mobile information device profile. A set of Java APIs, which, together with the CLDC, provides a complete J2ME application runtime environment targeted at mobile information devices. |
| XML | Extensible markup language |

Tools have been developed in recent years to aid in the design verification of hardware and software systems, for example software suites, hardware circuitry, and programmable logic designs. In order to assure that the design complies with its specifications, it is common to generate a large number of input or instruction sequences to assure that the design operates as intended under a wide variety of circumstances. In general, test systems produce a report indicating whether tests have been passed or failed, and, in some cases may even indicate a module that is estimated to be faulty.

Conventionally, test systems employing complex test suites employ a computer-implemented testing framework for computing devices, such as mobile information devices, and for software designed to run on such devices. A developer submits a computing product under development, typically a computing device or software that is designed to run on the device to the test system, which runs a selected battery of test programs on the product while monitoring its behavior. Each product under test requires an instance of an execution test harness, or the use of a stand-alone test execution API. The latter is described in commonly assigned application Ser. No. 10/347,748, entitled "Generating Standalone MIDlets from a Testing Harness", which is herein incorporated by reference.

In environments where testing of a product is ongoing, different aspects may be tested by different teams. As test results are evaluated, it is often necessary to revise the product under test, or to modify the test suites themselves. In such an environment, communicating such revisions to the different testing teams, maintaining version control, synchronization among the teams, and generally coordinating the testing activities is a difficult management problem. Errors could result in inappropriate testing and the wastage of valuable time and testing resources. Indeed, failure of coordination could result in the release of an inadequately tested product into the marketplace. A related problem when many test suites are being concurrently executed is the effort of setting up each test suite with its own test harness and environment. Bundling the test harness with the test suite is not a good solution, as the effort in maintaining up-to-date versions becomes formidable as the number of concurrently operating test suites increases, and when the product or the test suites are frequently modified by different test teams.

SUMMARY OF THE INVENTION

In accordance with a disclosed embodiment of the invention, a test execution system or framework consists of one central repository and includes a platform editor (also known as an administrative tool), which functions as a management unit. The central repository contains available test suites and binary files that constitute a single test execution harness. Using the management unit, a system administrator is enabled to control active versions of the various test suites, and their individual configurations. End users of this system install clients of the central repository, using a system-provided installer program. At the client, an execution script and a local configuration file are created. When the execution script is executed by the client, the binary files at the central repository are accessed, causing the test harness program to load at the client with all designated test suites being installed, configured and ready for execution. The client always has the most updated versions of all test suites, as configured by the system administrator, using the management unit. It is an advantage of the system that all necessary information is obtained from a single central location, without need for distributing local copies of the test harness or test suites, which could lead to loss of synchronization.

The invention provides a method for testing a plurality of computing products, which is carried out by providing a central repository holding data structures that include platforms, test suites, an execution test harness, and an installer. The method is further carried out by downloading and installing selected ones of the platforms and test suites from the central repository to a plurality of clients of the central repository, executing the execution test harness using the binary files residing on the central repository, and providing a platform editor for modifying at least one of the platforms, the test suites, and the execution test harness.

According to one aspect of the method, different selected platforms and test suites are installed on different clients.

According to another aspect of the method, the different clients execute the test suites concurrently.

According to a further aspect of the method, the different clients execute the test suites at different times.

The invention provides a computer software product, including a computer-readable medium in which computer program instructions are stored, which instructions, when read by a computer, cause the computer to perform a method for testing a plurality of computing products, which is carried out by defining a central repository holding data structures that include platforms, test suites, an execution test harness, and an installer. The method is further carried out by downloading selected ones of the platforms and the test suites at a plurality of clients of the central repository, each of which can execute the execution test harness using the binaries residing on the central repository, and defining a platform editor for modifying any of the platforms, the test suites, and the execution test harness.

The invention provides a test execution system for testing a plurality of computing products, including a central repository holding data structures, the data structures including platforms, test suites, an execution test harness, and an installer for downloading and installing selected platforms and test suites at a plurality of clients of the central repository, and a platform editor for modifying any of the platforms, the test suites, and the execution test harness. The execution test harness is run by the clients using the binaries residing on the central repository.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances well-known circuits, control logic, and the details of computer program instructions for conventional algorithms and processes have not been shown in detail in order not to unnecessarily obscure the present invention.

Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system, This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet.

System Architecture.

Figure 1:
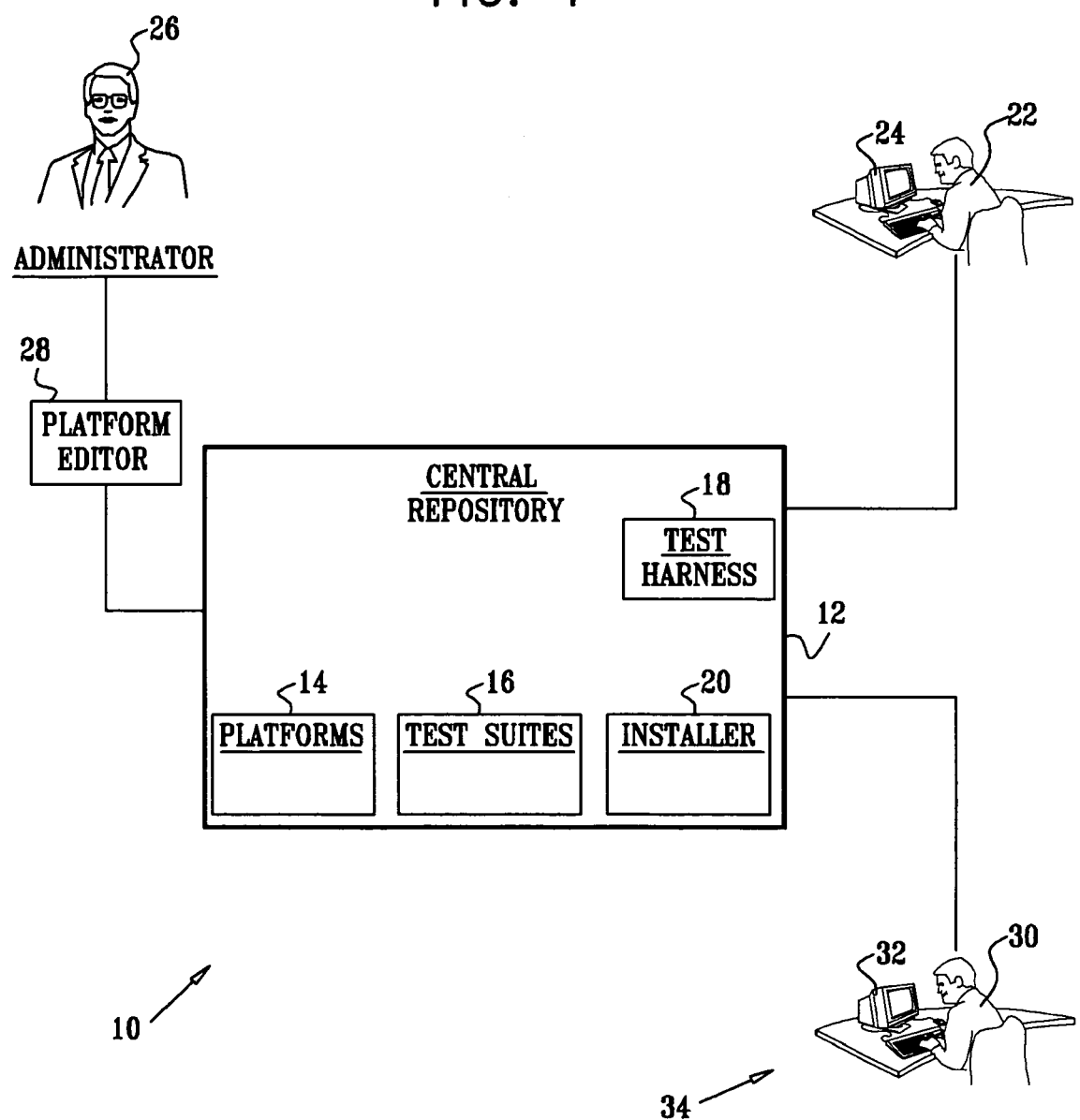
FIG. 1 is a block diagram of a system for centrally managing the simultaneous or sequential execution of multiple test suites on different platforms for verification of different hardware and software in accordance with a disclosed embodiment of the invention.

Turning now to the drawings, reference is initially made to FIG. 1, which is a high level block diagram of a system 10 for centrally managing the simultaneous or sequential execution of multiple test suites on different platforms for verification of different hardware and software in accordance with a disclosed embodiment of the invention. The heart of the system 10 is a central repository 12, which can reside on a local or a remote server, and which contains data structures necessary for multiple clients (test consoles) of the central repository 12 to perform testing simultaneously, or at different times. The central repository 12 holds data structures that define platforms 14, test suites 16, an execution test harness 18, and an installer 20. The installer 20 creates a script for launching the framework. The script includes paths to binary files of the test execution framework. The binaries themselves are located in only one place, the central repository 12. Centrally locating the binary files is highly advantageous, as only one instance of each binary file need be updated. Furthermore, each user is guaranteed to see the most current version of the framework. Because distribution of local copies of the binaries is avoided, users need not be concerned about having outdated software. The execution test harness 18 may be implemented as a modification of the "Java Device Test Suite" execution framework (JDTS) (version 1.0 or higher), available from Sun Microsystems, Inc., which employs MIDP.

Typically the installation is packaged in an archive, such as a JAR file. The system 10 is capable of being controlled by a single operator 22, using a client terminal 24. However, in many environments it is desirable that a superuser, or administrator 26, manage the central repository 12. This is done using a platform editor 28, which acts as a management unit. Using the platform editor 28, the administrator 26 is capable of reconfiguring the platforms 14, test suites 16, execution test harness 18, and installer 20. An end user 30 interacts with the central repository 12 via a client terminal 32. The end user 30 launches an execution package, which is first downloaded and installed from the central repository 12. The end user 30 and the terminal 32 may be co-located with the other components of the system 10, or alternatively may be located remotely and connected to the central repository 12 via a data network. Although only one instance of the end user 30 is shown, it will be understood that many end users can interact with the central repository 12 concurrently, or at different times, using the same or different platforms and the same or different test suites. The end user 30 and the terminal 32 are referred to hereinbelow as a client 34.

The system 10 is suitable for use in many development environments, including MIDlet development using J2ME. It may be adapted to J2EE and J2SE environments using programming techniques known to the art.

System—Functional Organization.

Continuing to refer to FIG. 1, the central repository 12 contains test parameters, platform configuration parameters, framework parameters and the tests themselves. The end user 30 makes use of the central repository 12 in a "session". In an implementation of a session for a framework application in the execution state, contents of the central repository 12 are stored and loaded. The disclosure of the system implementation is common to the platform editor 28, which manages platforms by using the central repository 12, and by the execution framework, including the installer 20, which creates an execution script and local configuration files. The execution test harness 18 is not downloaded. Its binary files remain on the central repository 12.

Figure 2:
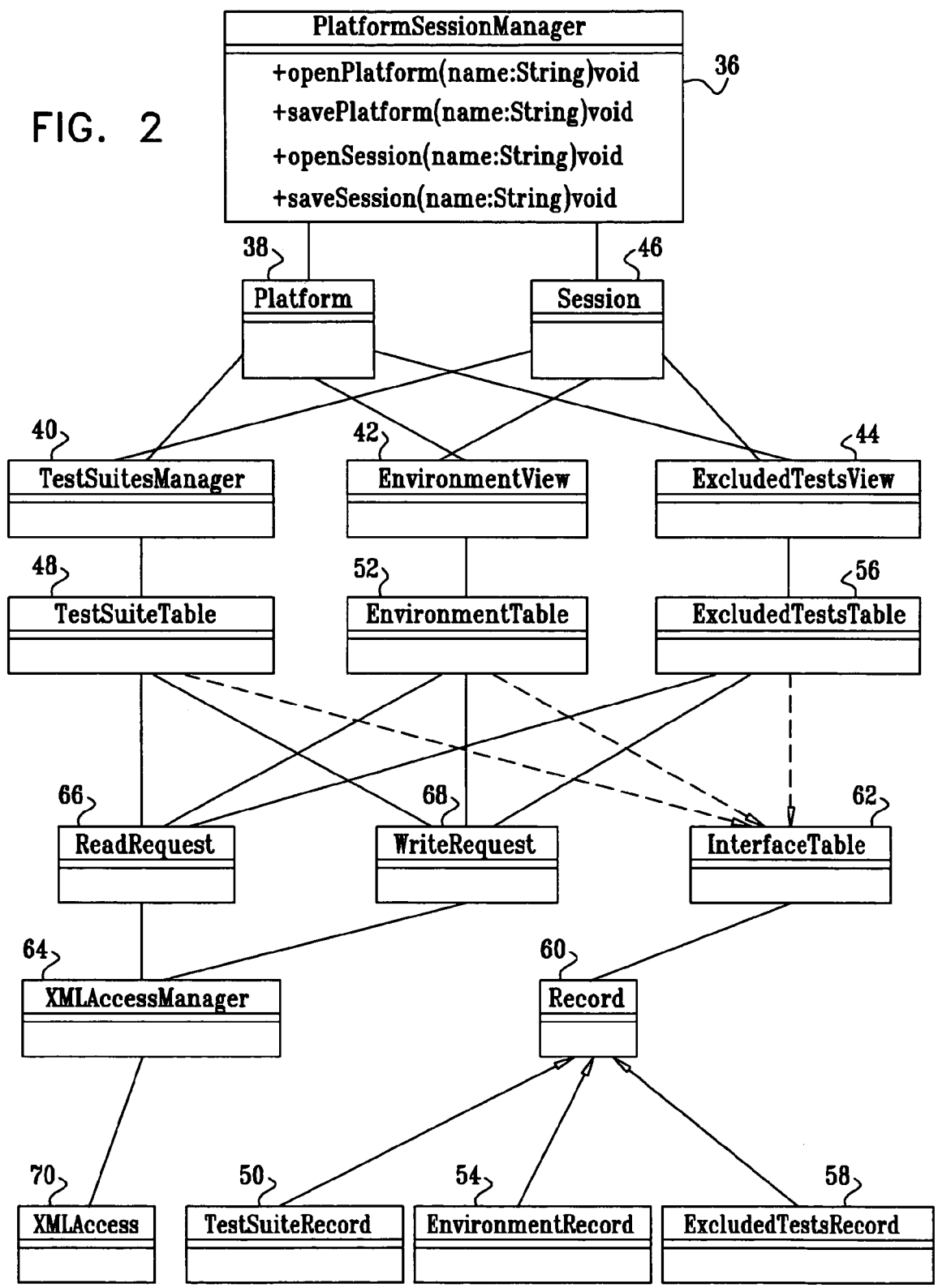
FIG. 2 is a functional block diagram of a session implementation in the system shown in FIG. 1, in accordance with a disclosed embodiment of the invention.

Reference is now made to FIG. 2, which is a high level functional block diagram of an implementation of the platform editor 28 (FIG. 1) in accordance with a disclosed embodiment of the invention. A class PlatformSessionManager 36 has methods for loading and saving platforms and sessions.

A class Platform 38 encapsulates all platform specific information. An instance of the class Platform 38 includes such information as available test suites, and their respective properties, as well as other platform-specific information. The test suites and their properties are managed by a class TestSuitesManager 40. Platform-specific information is managed by a class EnvironmentView 42. Tests in the test suites can be excluded from performance by a class ExcludedTestsView 44.

A class Session 46 encapsulates all information specified by the client 34 (FIG. 1). Such client specific information includes the basic properties of the test suites and the platform that applies to a particular session of the client 34.

The class Platform 38 and the class Session 46 interact with the class TestSuitesManager 40, the class EnvironmentView 42, and the class ExcludedTestsView 44.

The class TestSuitesManager 40 interacts with a table TestSuiteTable 48, which contains records of the different test suites, as indicated by a class TestSuiteTable 50.

The class EnvironmentView 42 interacts with a table EnvironmentTable 52, which contains records of known platform environments, as indicated by a representative table EnvironmentRecord 54.

The class ExcludedTestsView 44 interacts with a table ExcludedTestsTable 56, which contains records of excluded tests, as indicated by a representative class ExcludedTestsRecord 58.

Records originating from the class TestSuiteTable 50, the table EnvironmentRecord 54, and the class ExcludedTestsRecord 58, are included in a class record 60, and initially written to an interface table 62, before being ultimately transferred to an appropriate one of the table EnvironmentTable 52, the table EnvironmentRecord 54, or the table ExcludedTestsTable 56. The class record 60 is detailed in Listing 1.

A class XMLAccessManager 64 accepts requests from the class TestSuitesManager 40, the class EnvironmentView 42, and the class ExcludedTestsView 44 for read or write operations to and from the class Platform 38 and the class Session 46. The class XMLAccessManager 64 manages queues of read requests 66, write requests 68, and executes them sequentially.

A class XMLAccess 70 contains a single access point to XML files that represent platforms and sessions. It has methods for read/write access to these XML files.

System Operation—Platform Editor.

Referring again to FIG. 1 and FIG. 2, a typical platform using the platform editor 28 is shown by the pseudo-code fragment of Listing 2. The output of the procedure shown in Listing 2 is a XML file representing a platform, appropriately configured and accessible to the end user 30 (FIG. 1). The configuration parameters of platforms and test suites are written such that they contain variables, which can be replaced by the end user 30.

Figure 3:
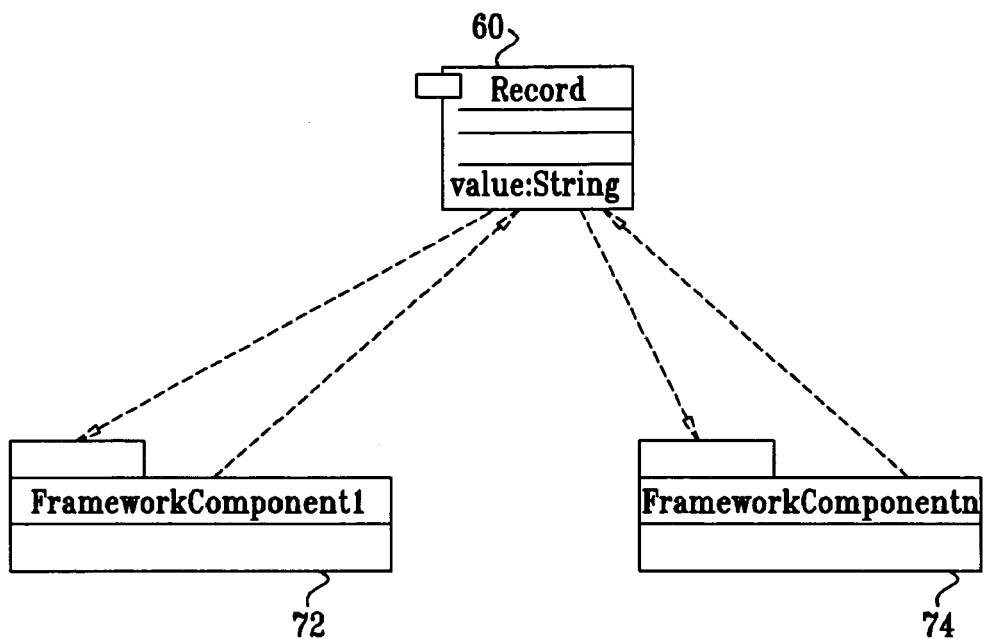
FIG. 3 is a detailed block diagram illustrating the modification of records in the session implementation of FIG. 2, in accordance with a disclosed embodiment of the invention.

Reference is now made to FIG. 3, which is a block diagram illustrating the modification of records in the class record 60 (FIG. 2) using the procedure of Listing 2, in which framework components 72, 74 may be extracted from the table TestSuiteTable 50, the table EnvironmentTable 52, and the table ExcludedTestsTable 56.

For example, assume that a test suite x has a parameter that points to its classes directory. This parameter should be written as follows:

TestClassesDir=PARENT_DIR/bin/classes.

A system component replaces the parameter PARENT_DIR according to an entry in a local configuration file, local.configuration, which contains the path to the directory TestClassesDir. This operation is implemented using Listing 3, which is a pseudo-code fragment from the class record 60 (FIG. 2).

System Operation—Client.

With continued reference to FIG. 1 and FIG. 2, after the client 34 loads a platform from the central repository 12, it creates a session object, that is an instance of the class Session 46, which is based on the platform object, that is the class Platform 38. This session object contains only those basic properties that can be modified by the client 34. The session and platform objects contain all the information taken from the central repository 12, using the path replacement mechanism disclosed above. The client 34 can then operate as if a conventional local installation of the test suite and harness had occurred. The sequence of events is illustrated in the pseudocode of Listing 4.

Conflict Resolution—General.

Continuing to refer to FIG. 1 and FIG. 2, as noted above, the central repository 12 (FIG. 1) contains all available platform and test suite properties, which can be edited by the administrator 26. These properties are logically divided into basic and advanced categories. Basic properties are accessible and locally modifiable by the client 34 (FIG. 1), while advanced properties are generally read-only as to the client 34. The end user 30 only has read-only access to the central repository 12. Thus, if a particular property were changed by the administrator 26 and written to the central repository 12, and were also changed locally by the end user 30, conflicts and loss of data coherence could easily arise at that particular client.

Issues concerning shared properties are dealt with according to a system-imposed policy. The implementation is based on the system component disclosed above. It will be recalled that the client 34 creates a session object, which is based on the platform object that it received from the central repository 12. The session object contains the same basic parameters as the platform object. As also noted above, the platform and session objects consist of test suites, framework and platform-specific environment properties. Each test suite and property is represented by the class record 60, shown in Listing 1, and its extensions, the class TestSuiteTable 50, the class EnvironmentRecord 54, and the class ExcludedTestsRecord 58.

The fields of the class record 60 on which the resolve mechanism is based on are:
public static final int COUNTER=10; and
public static final int MODIFIED=11.

The resolution mechanism has a server-side component, implemented in the central repository 12 (FIG. 1), and a client-side component involving the client 34.

Figure 4:
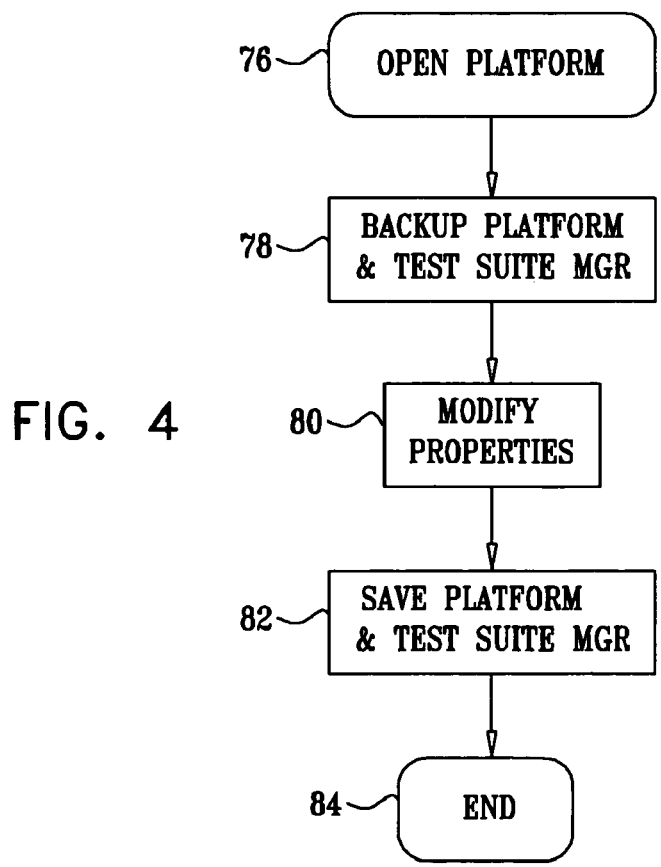
FIG. 4 is a flow chart illustrating aspects of a method of conflict resolution in accordance with a disclosed embodiment of the invention.
Figure 5A:
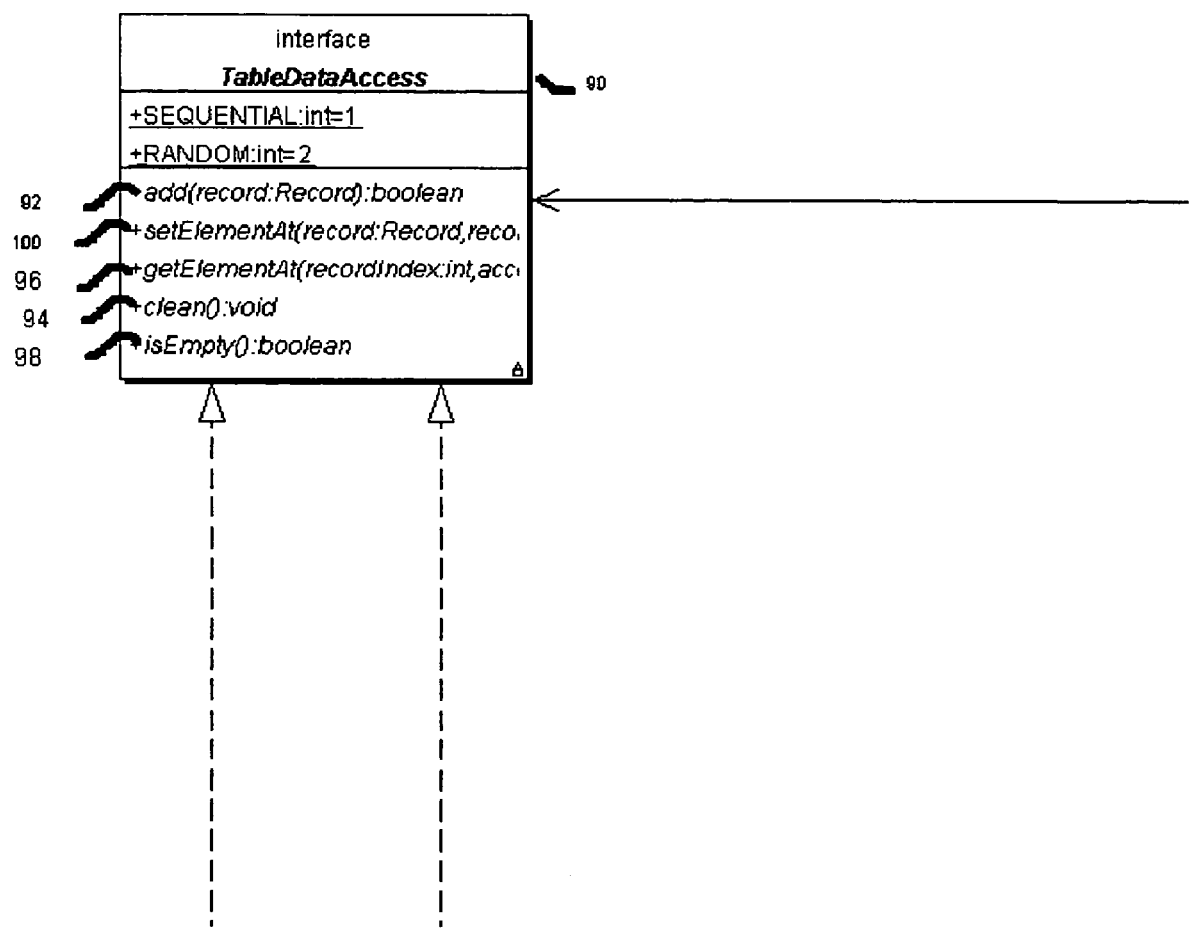
FIG. 5 and FIGS. 5AA-5AJ, 5BA-5BJ, 5CA-5CJ, 5DC-5DJ, 5EC-5EH, 5FC-5FH, AND 5GG-5GH, collectively referred to herein as FIG. 5, are respectively a small scale view of a class diagram of the system shown in FIG. 1, and partial views thereof, wherein the small scale view indicates the positions of the parts shown in the partial views.
Figure 5A:
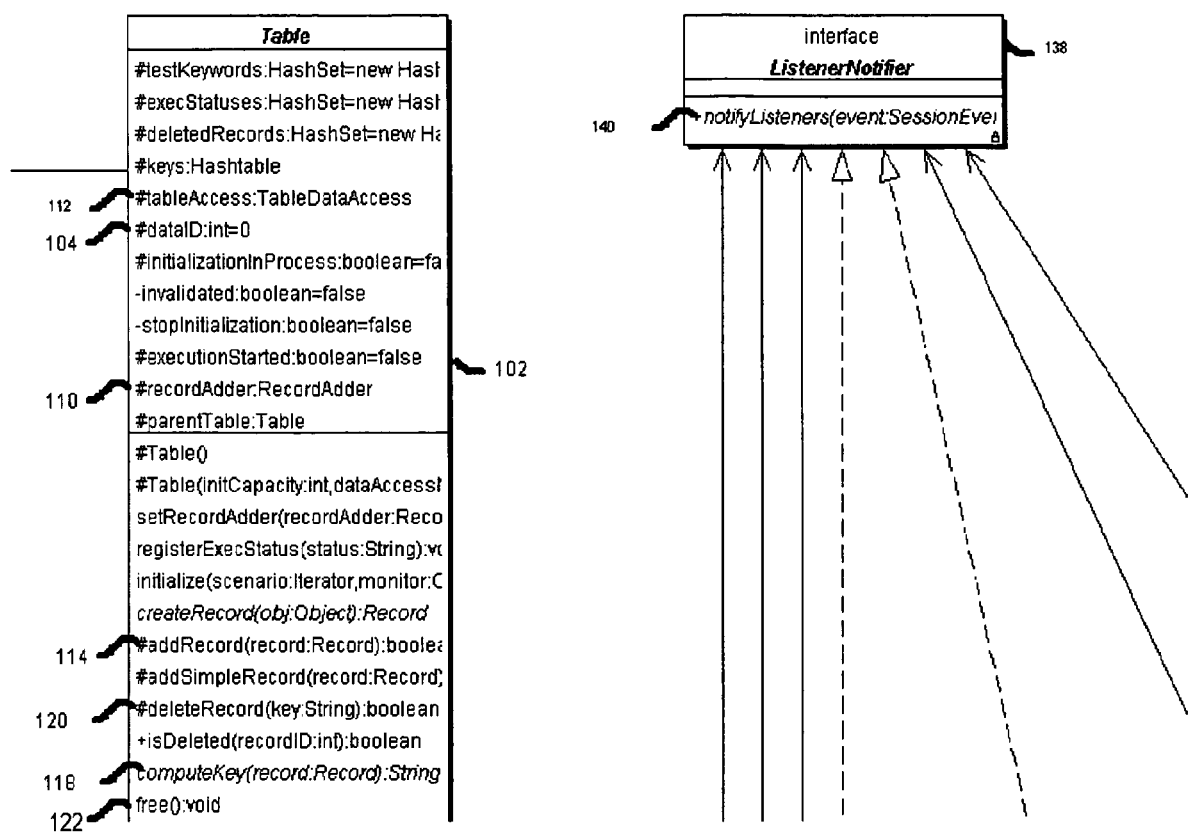
Figure 5A:
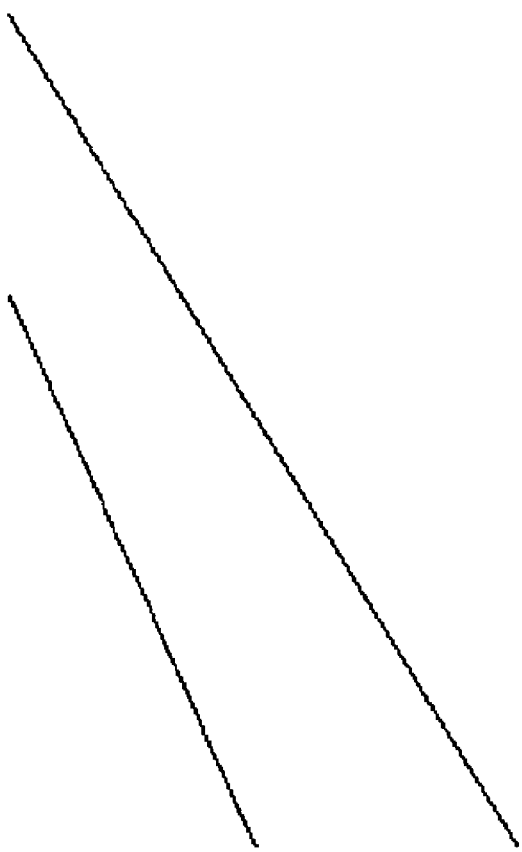
Figure 5A:
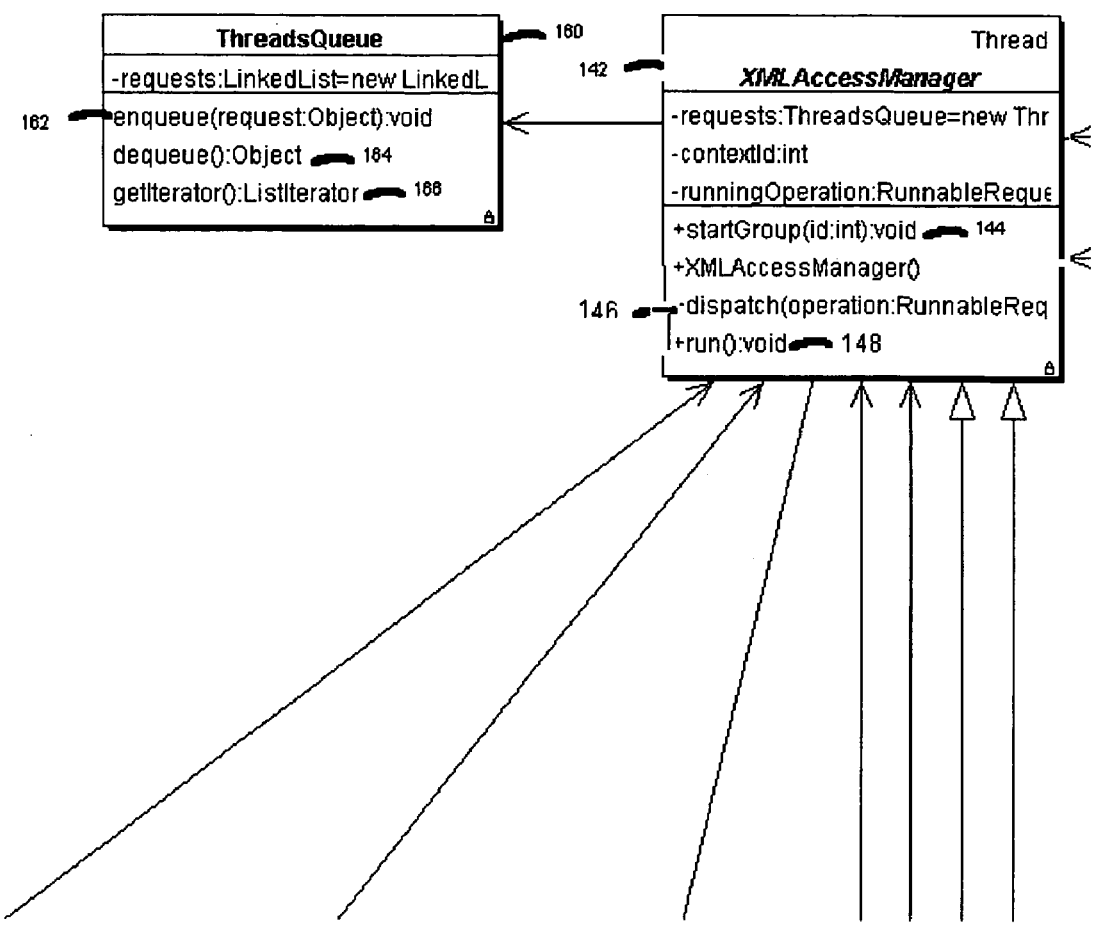
Figure 5A:
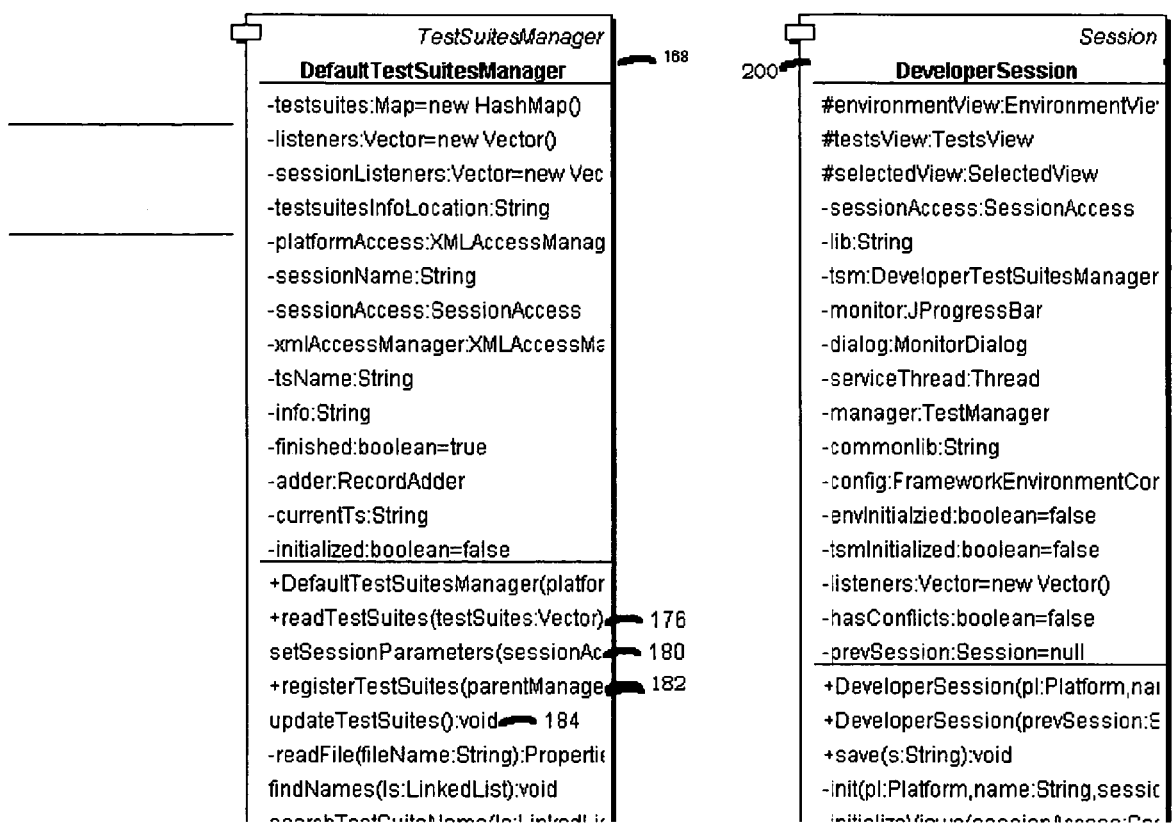
Figure 5A:
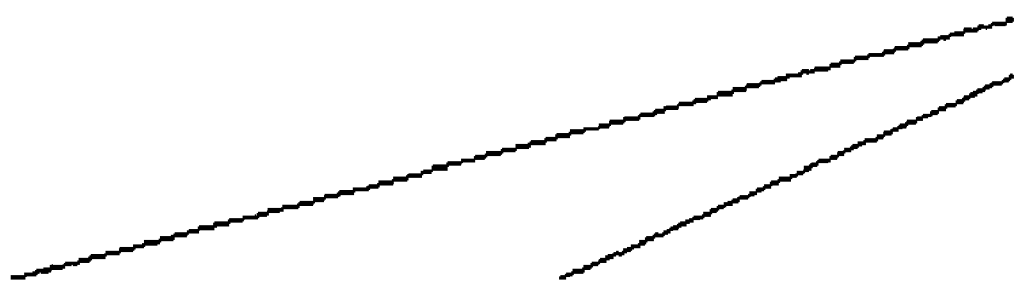
Figure 5A:
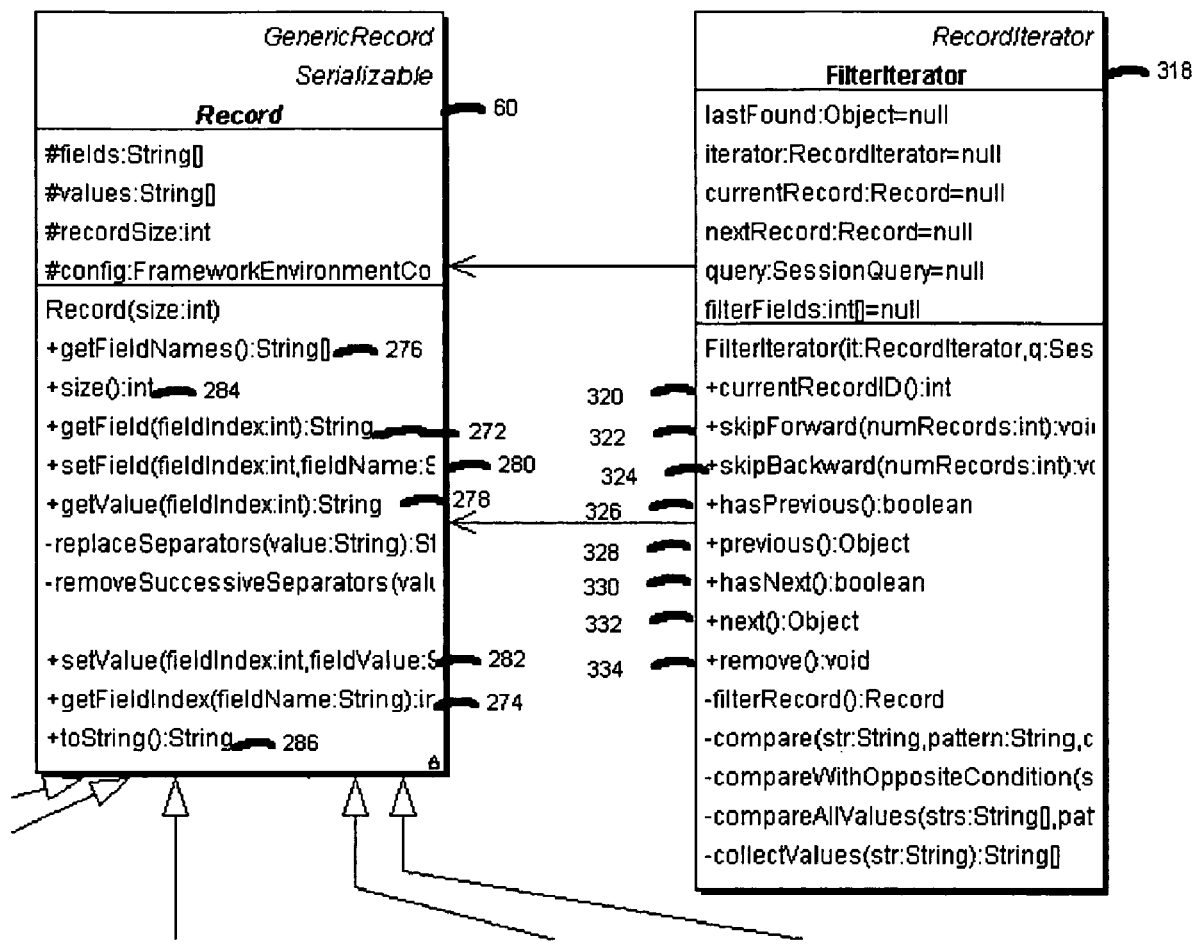
Figure 5A:
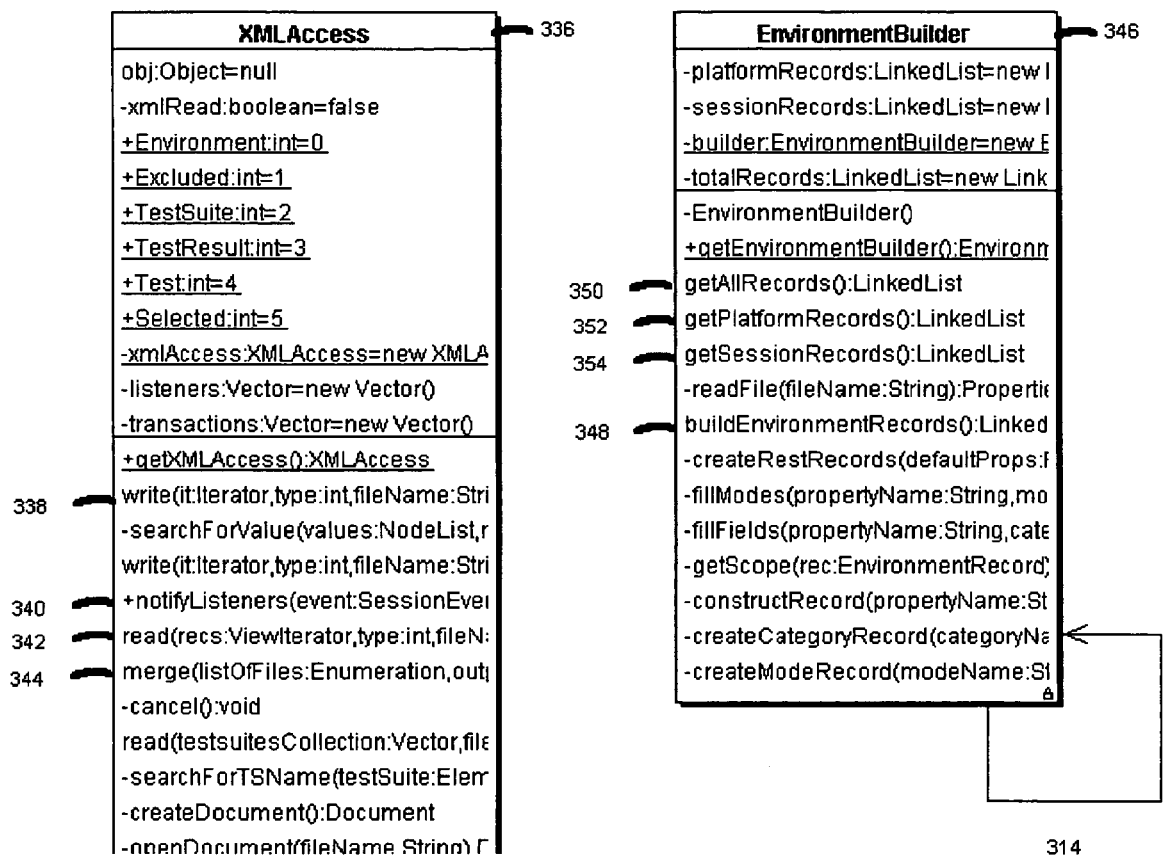
Figure 5B:
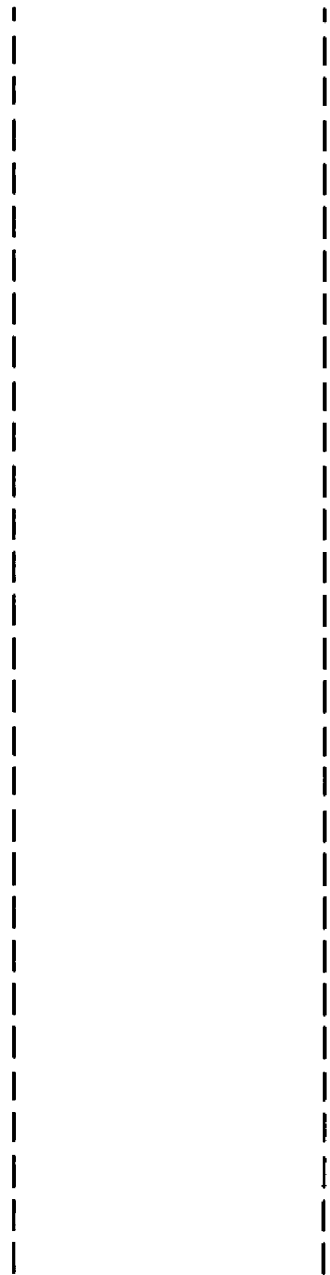
Figure 5B:
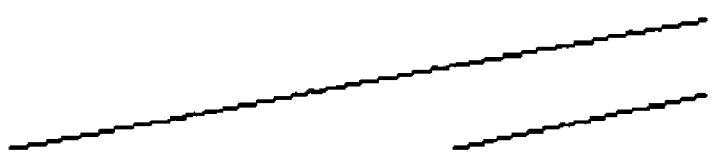
Figure 5B:
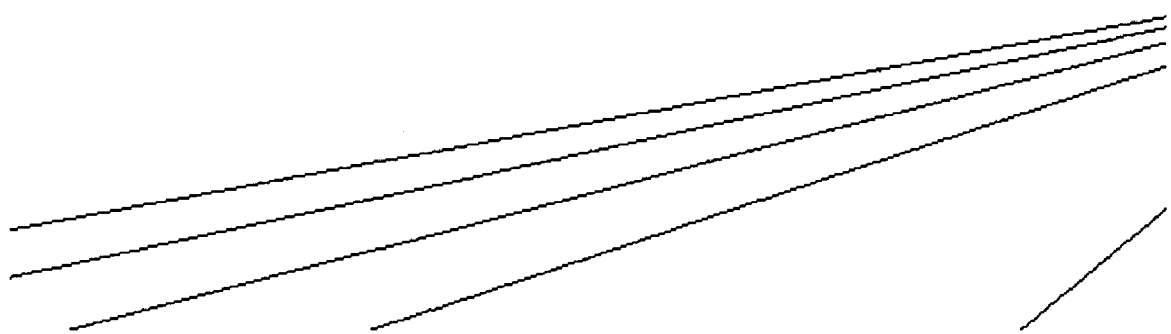
Figure 5B:
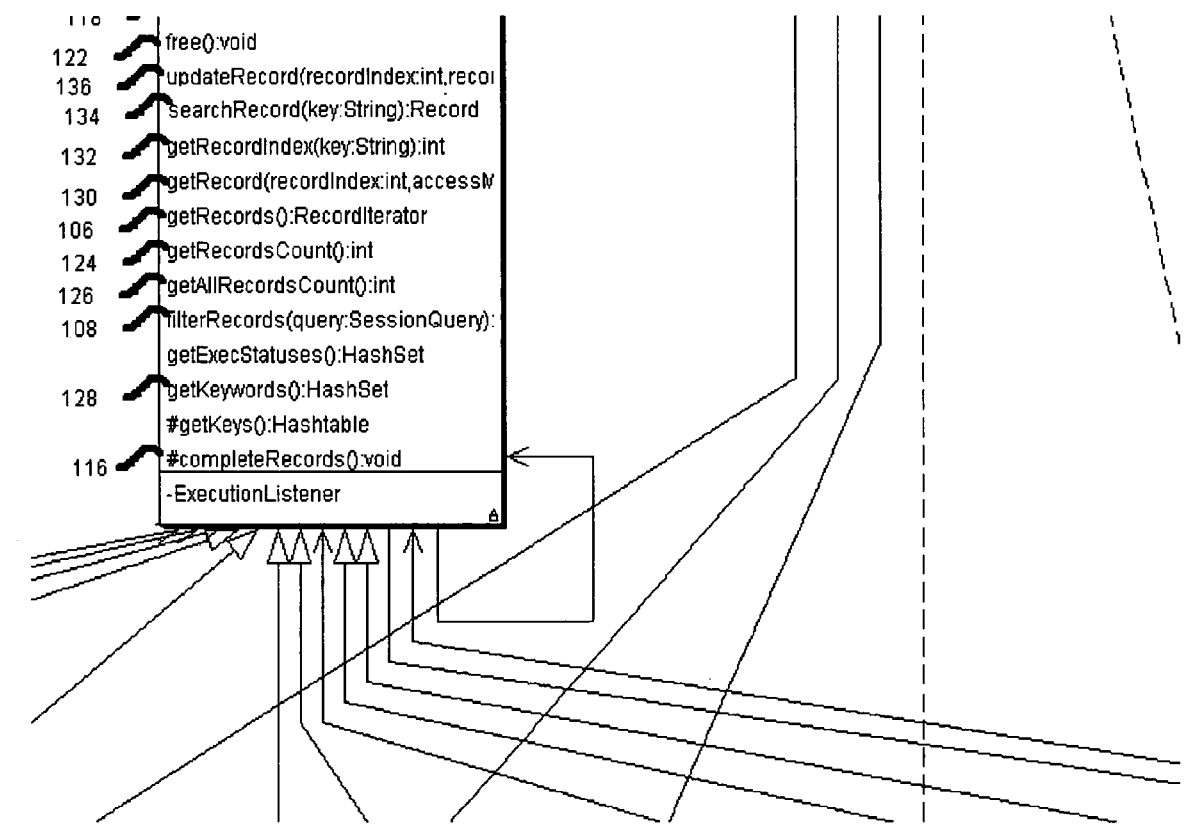
Figure 5B:
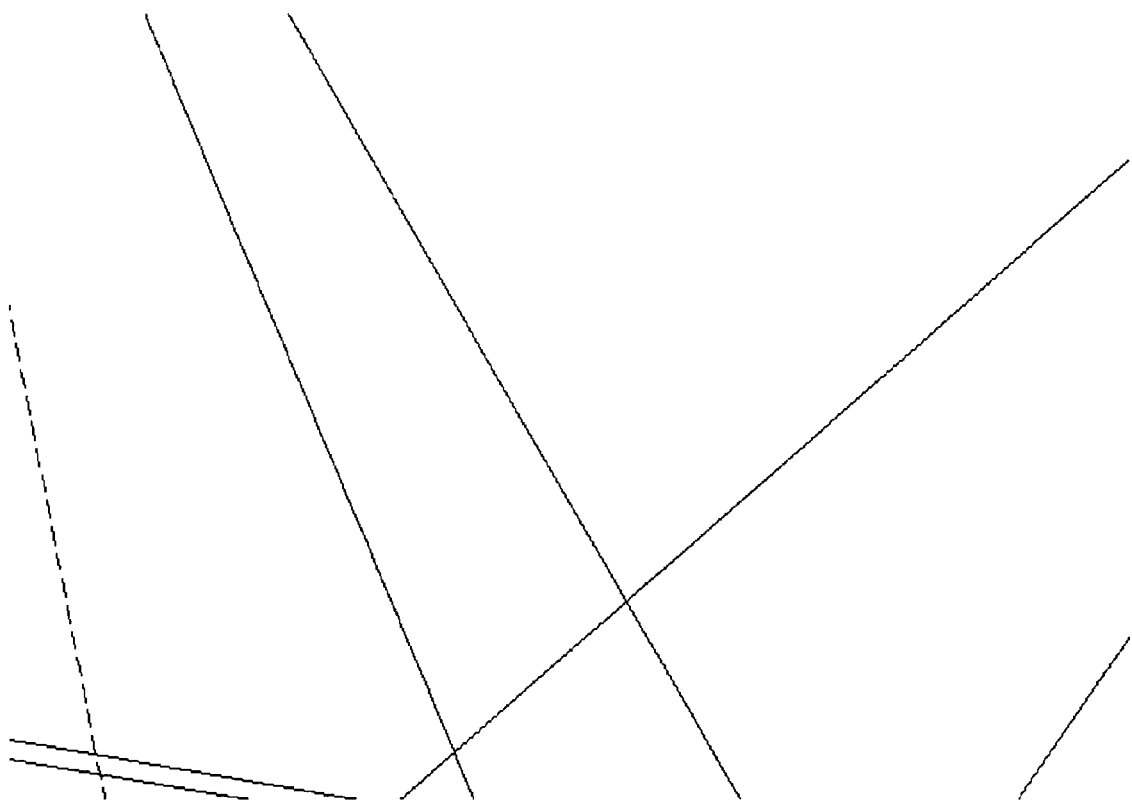
Figure 5B:
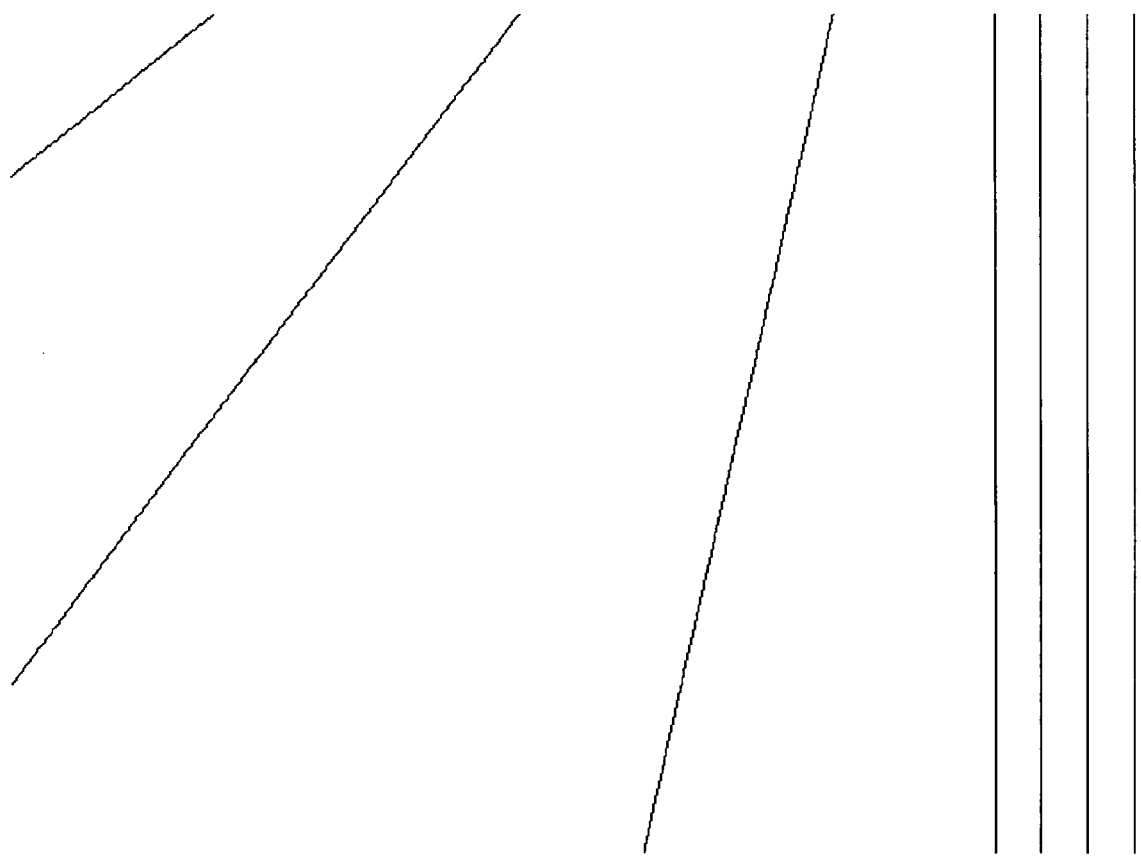
Figure 5B:
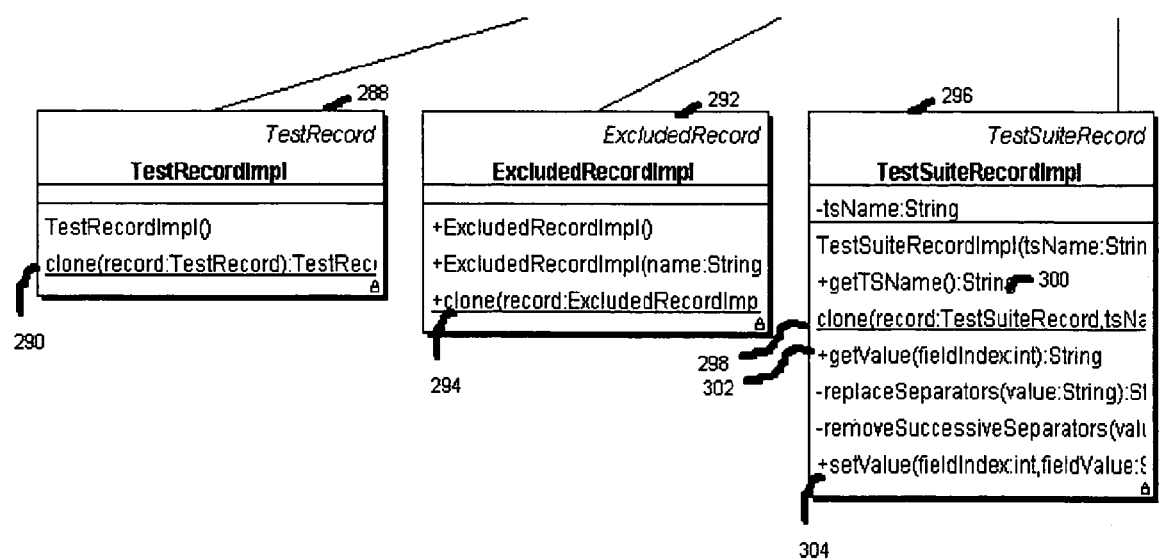
Figure 5B:
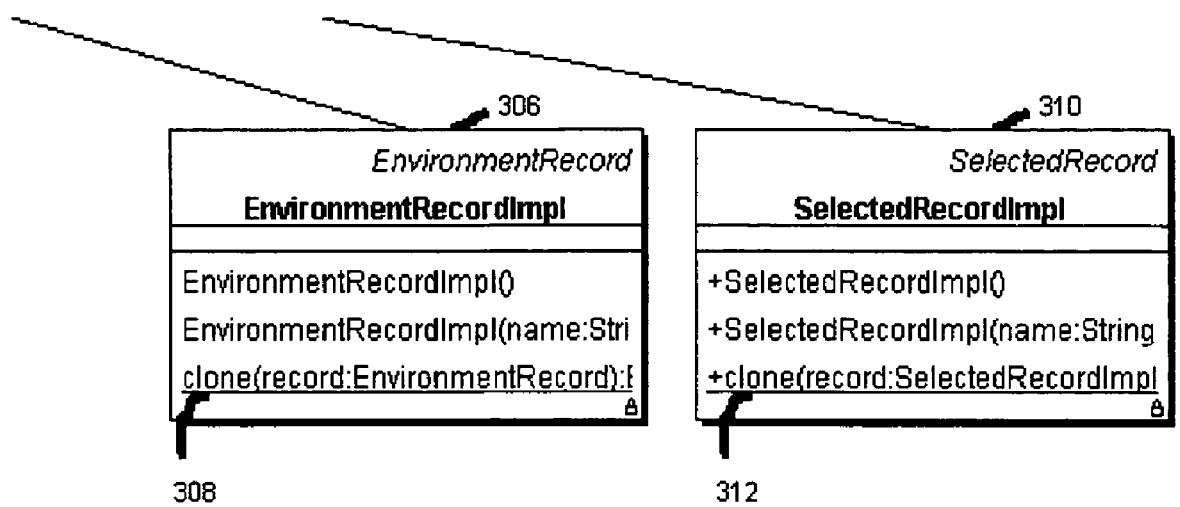
Figure 5B:
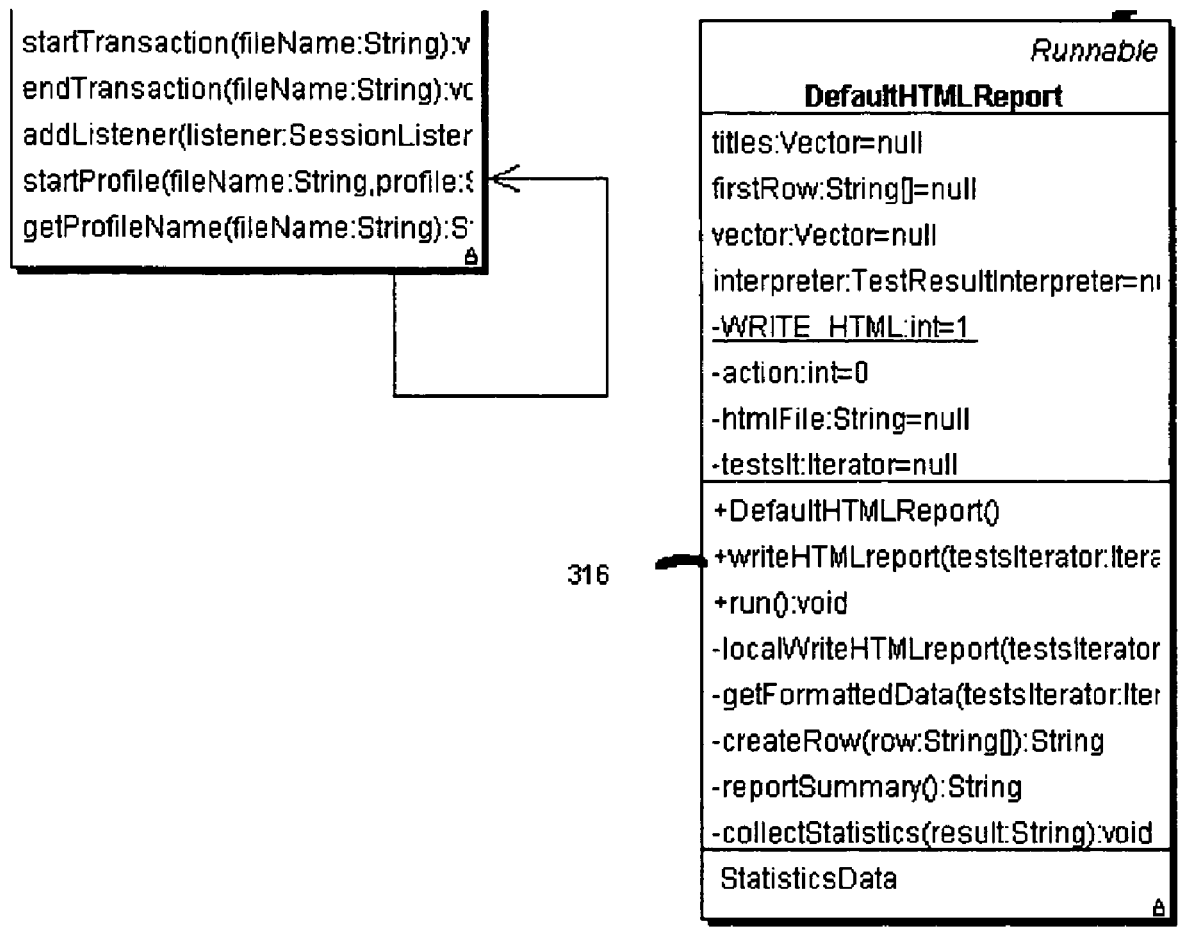
Figure 5C:
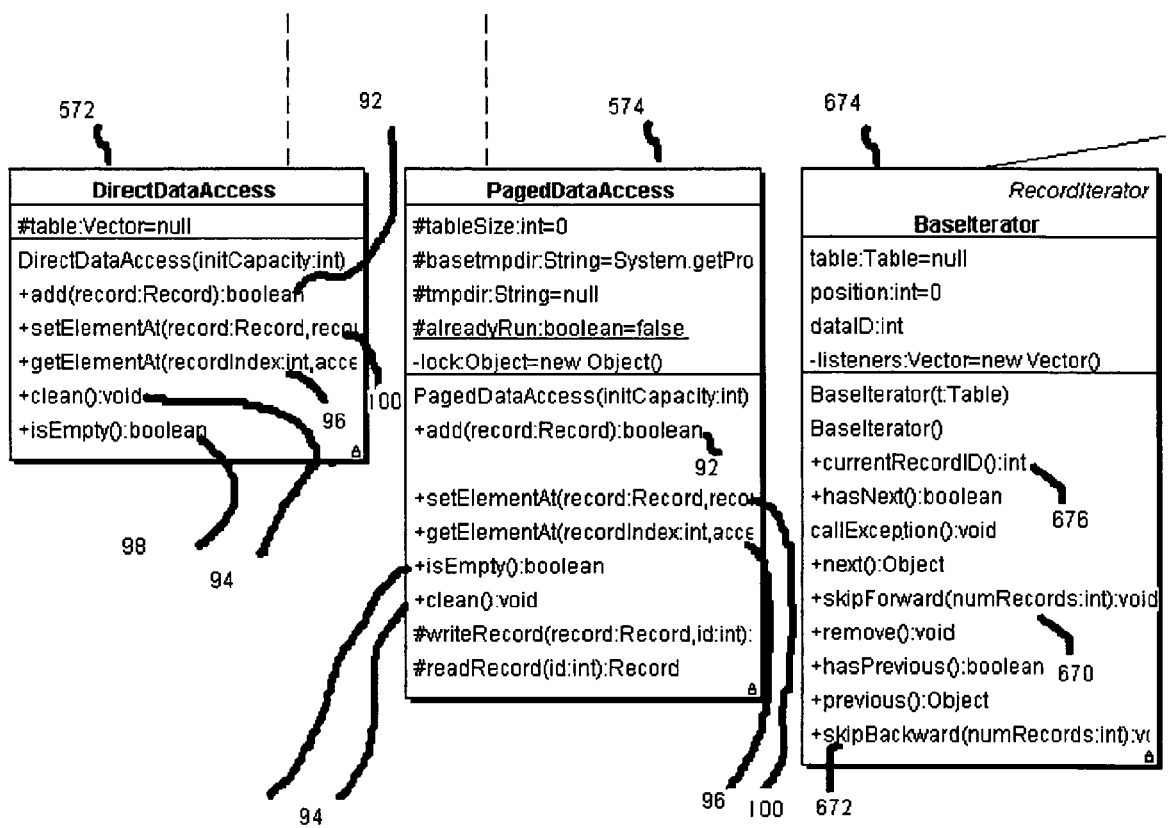
Figure 5C:
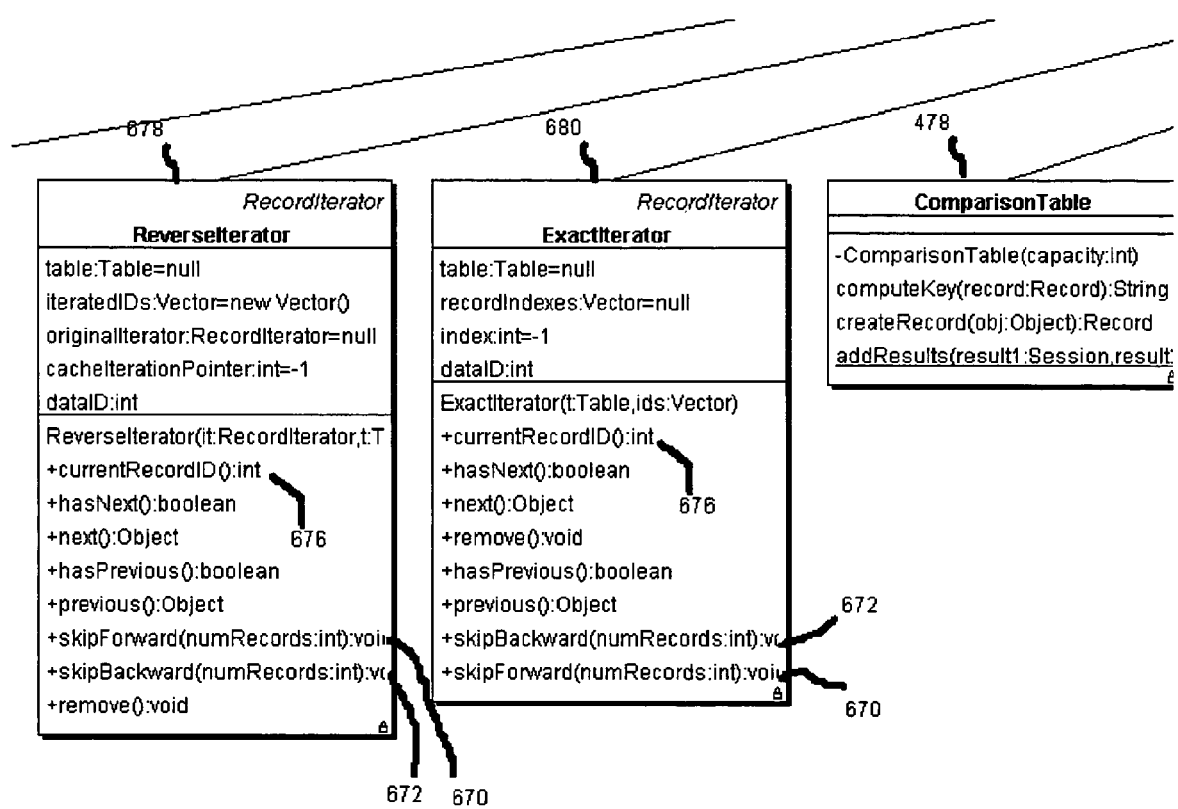
Figure 5C:
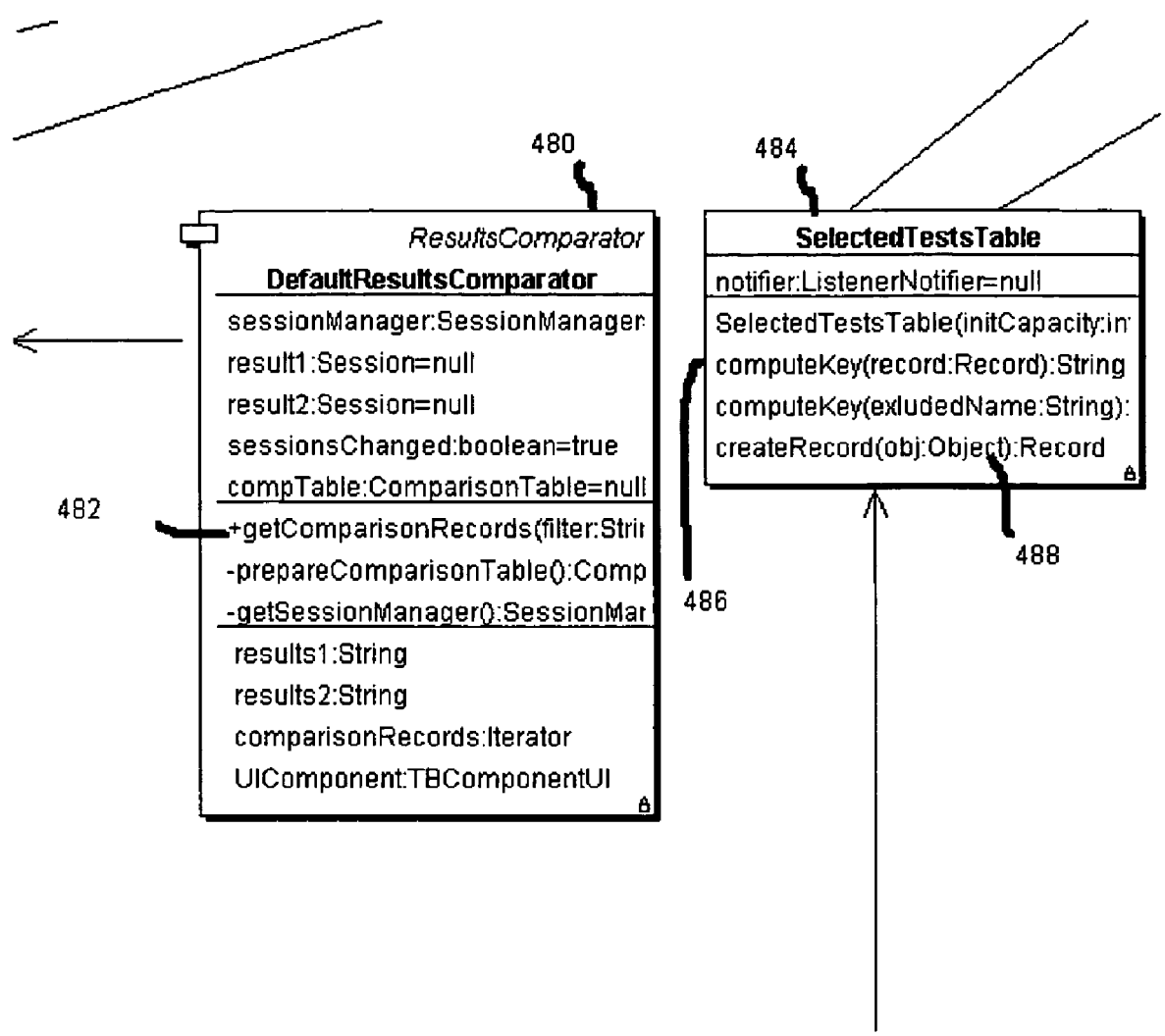
Figure 5C:
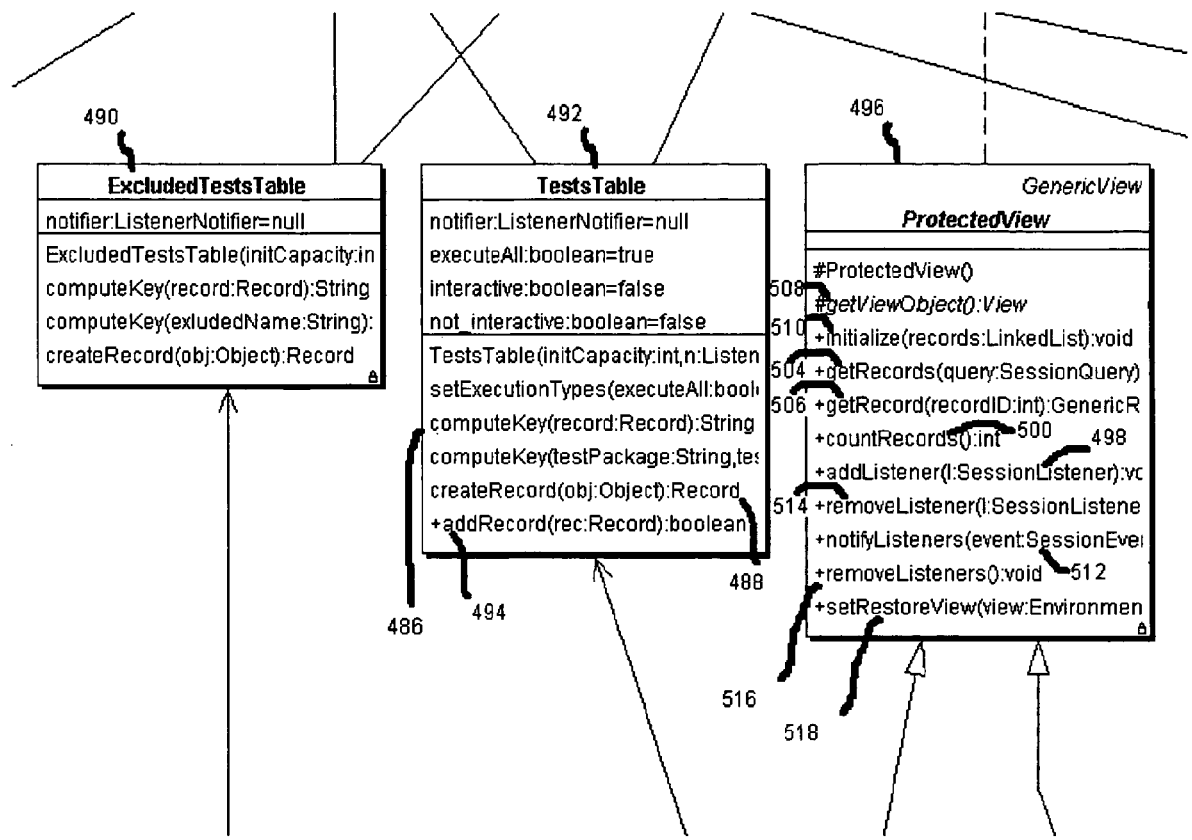
Figure 5C:
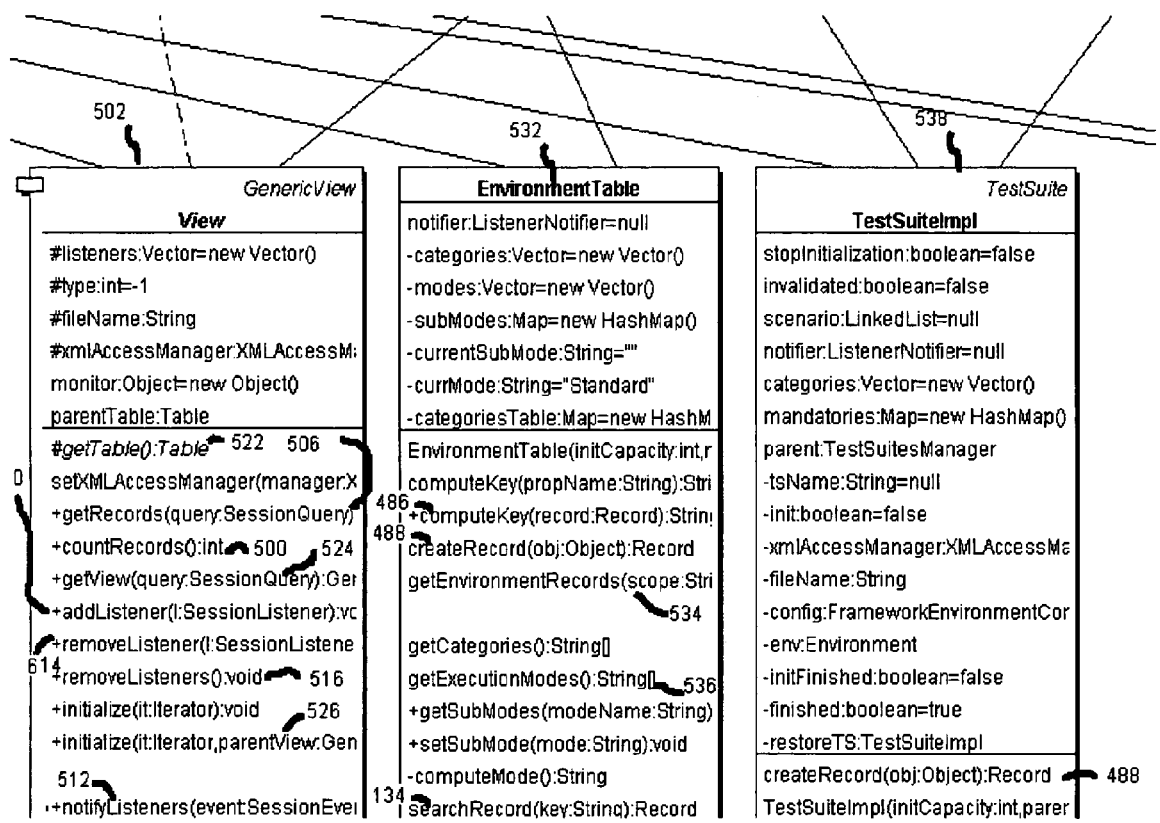
Figure 5C:
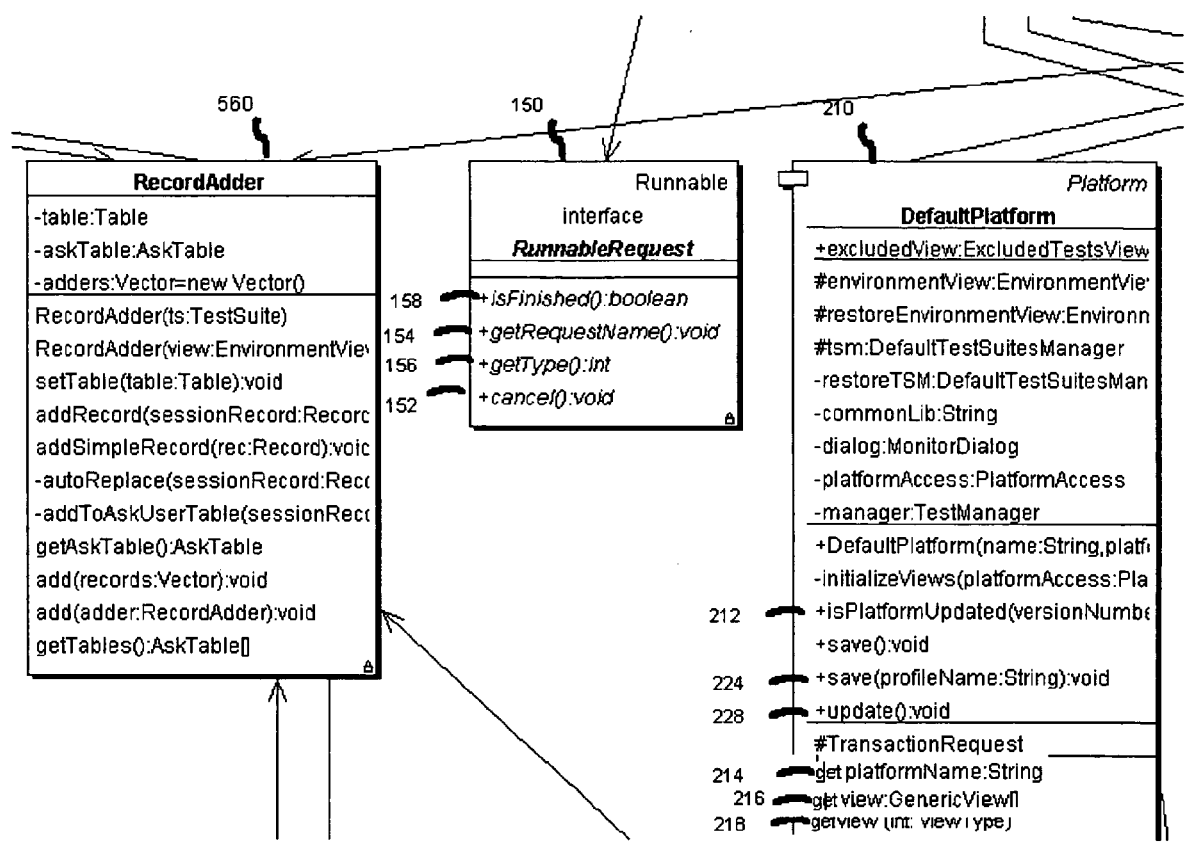
Figure 5C:
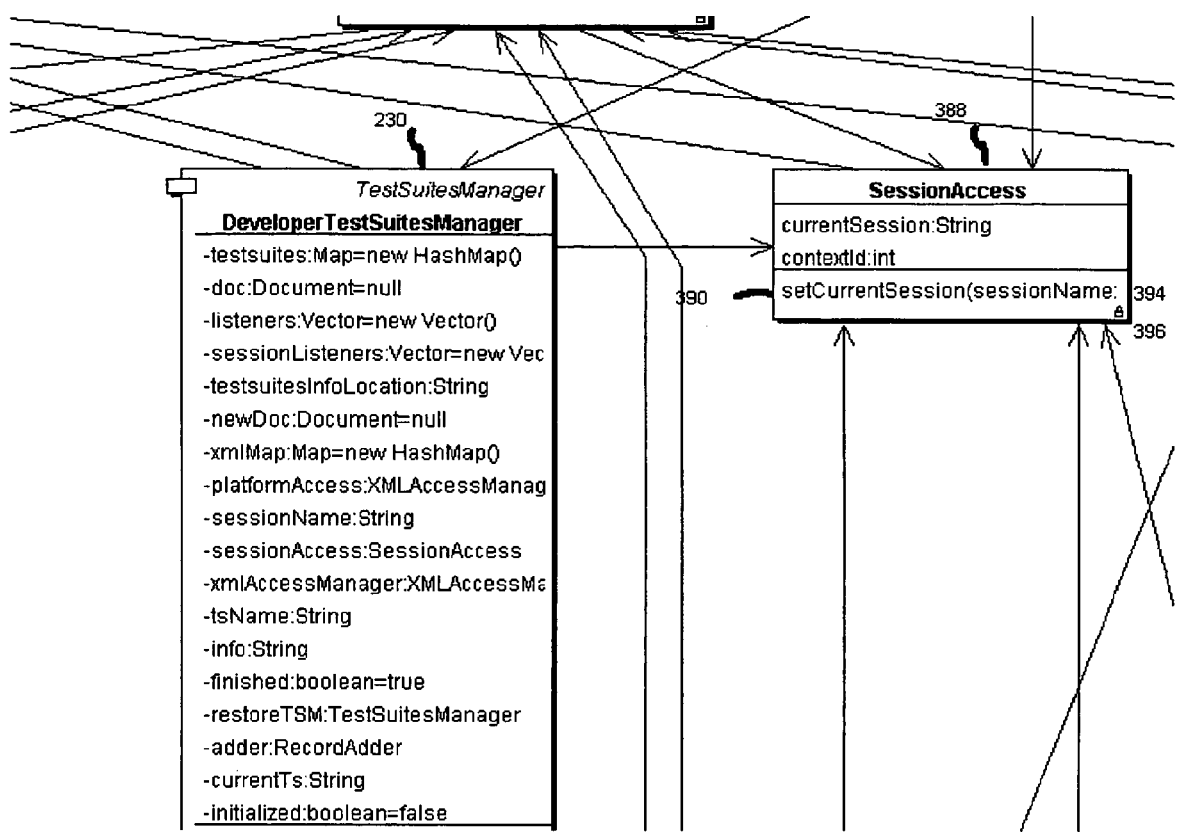
Figure 5C:
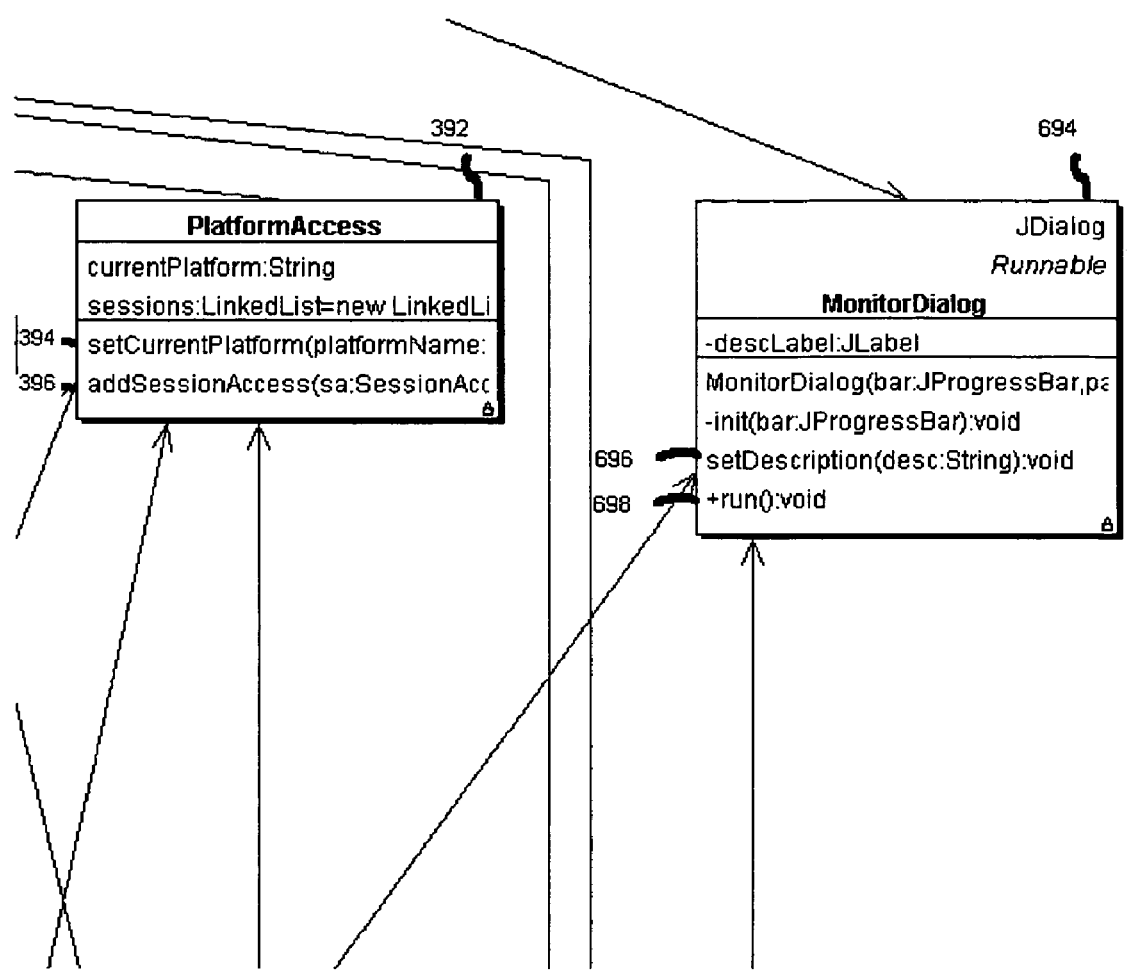
Figure 5C:
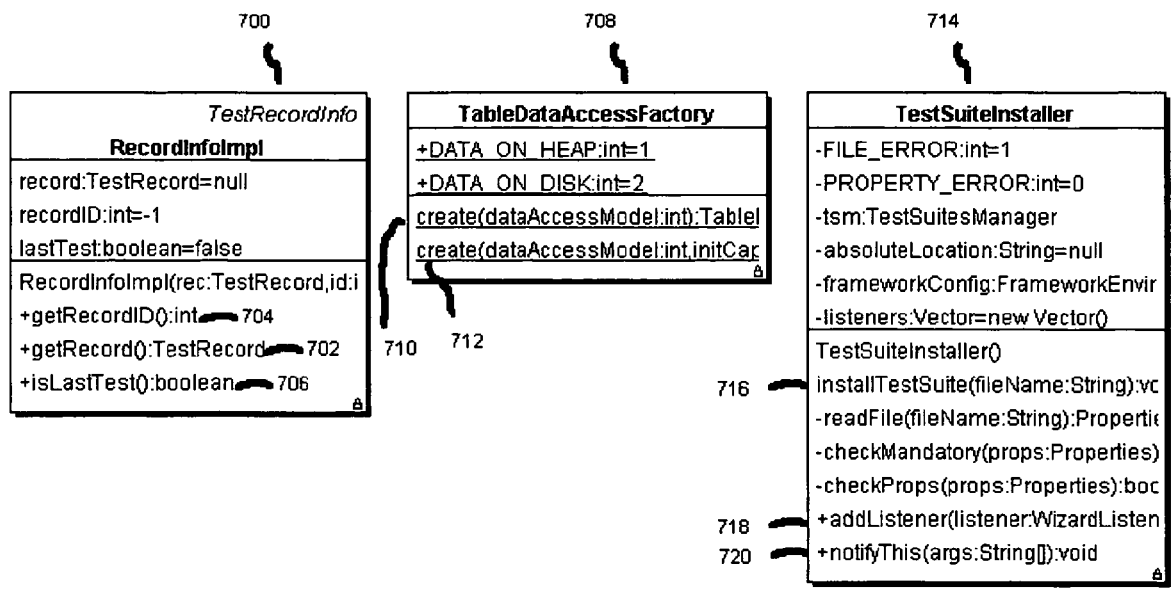
Figure 5C:
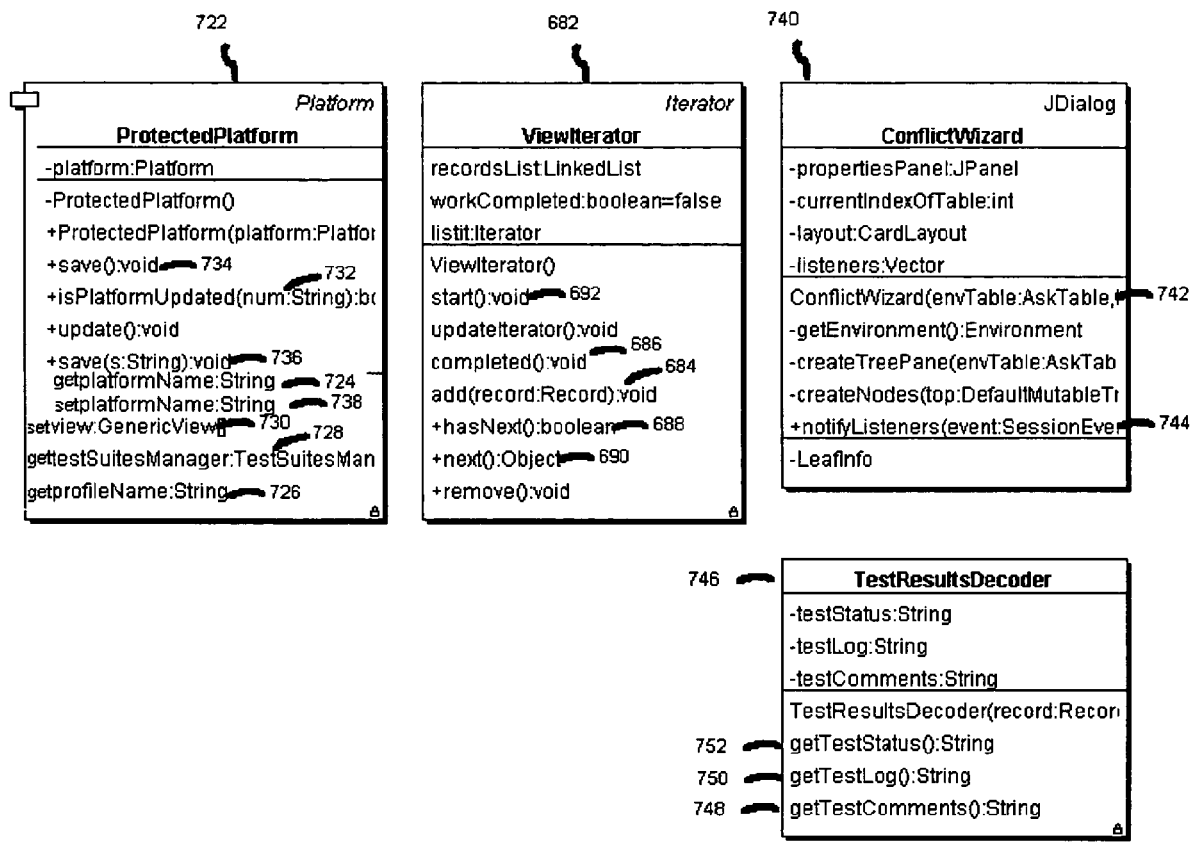
Figure 5D:
Figure 5D:
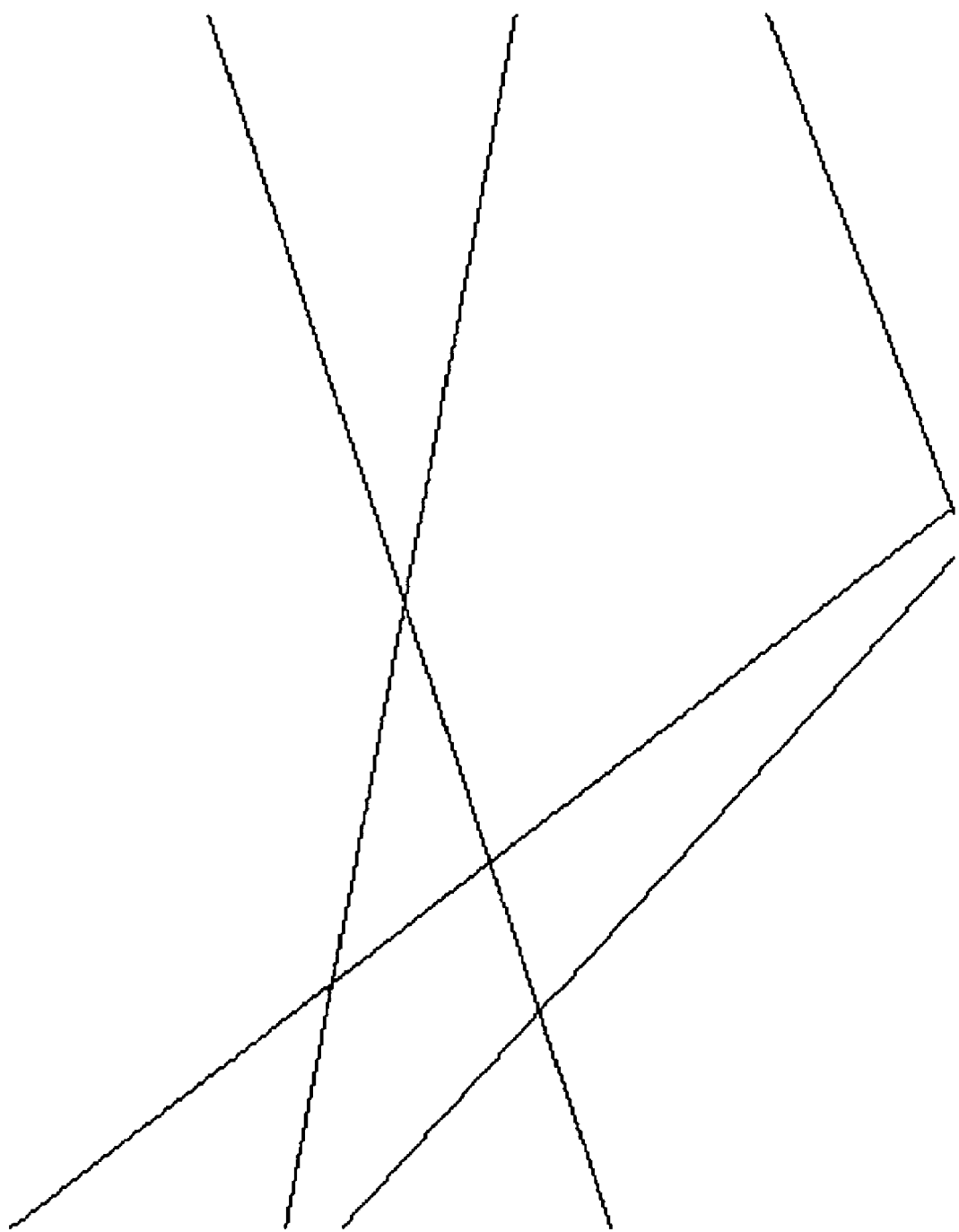
Figure 5D:
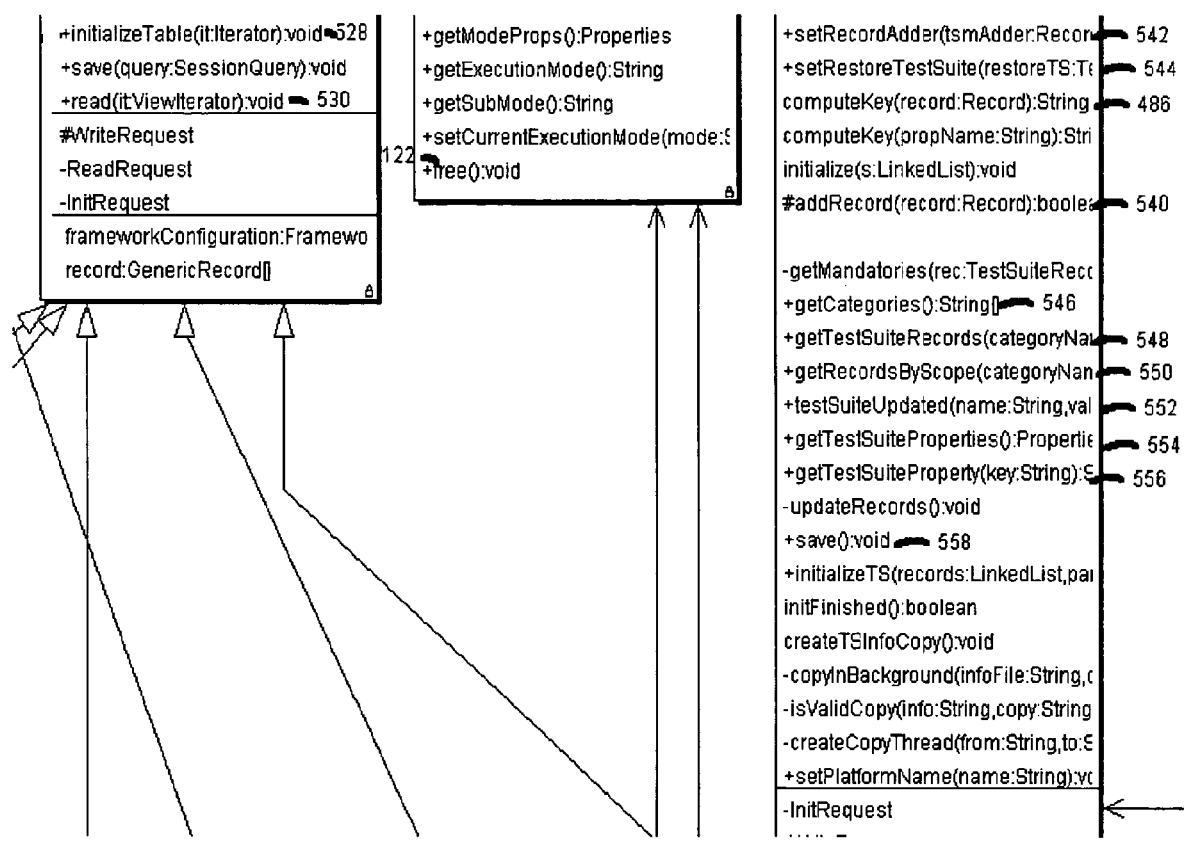
Figure 5D:
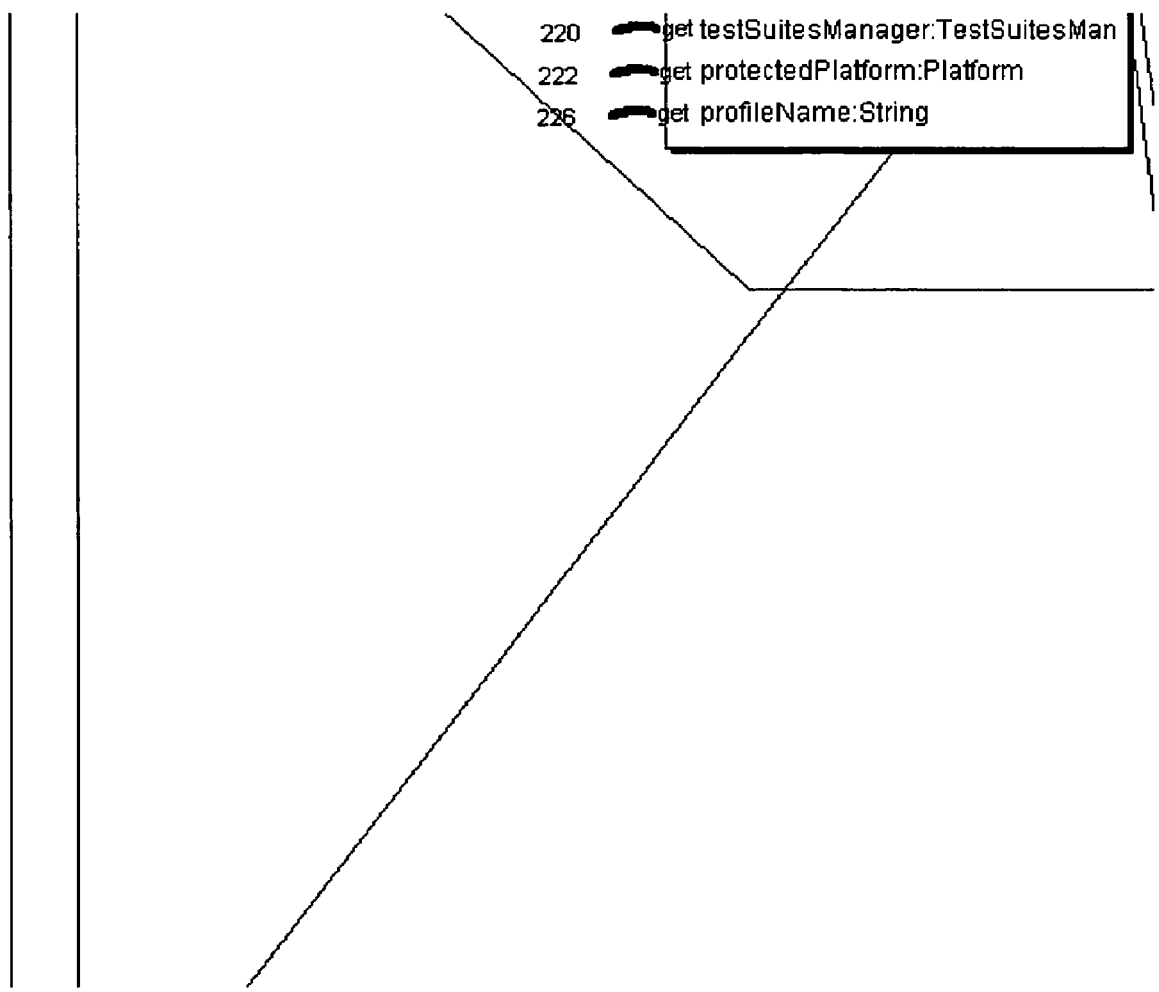
Figure 5D:
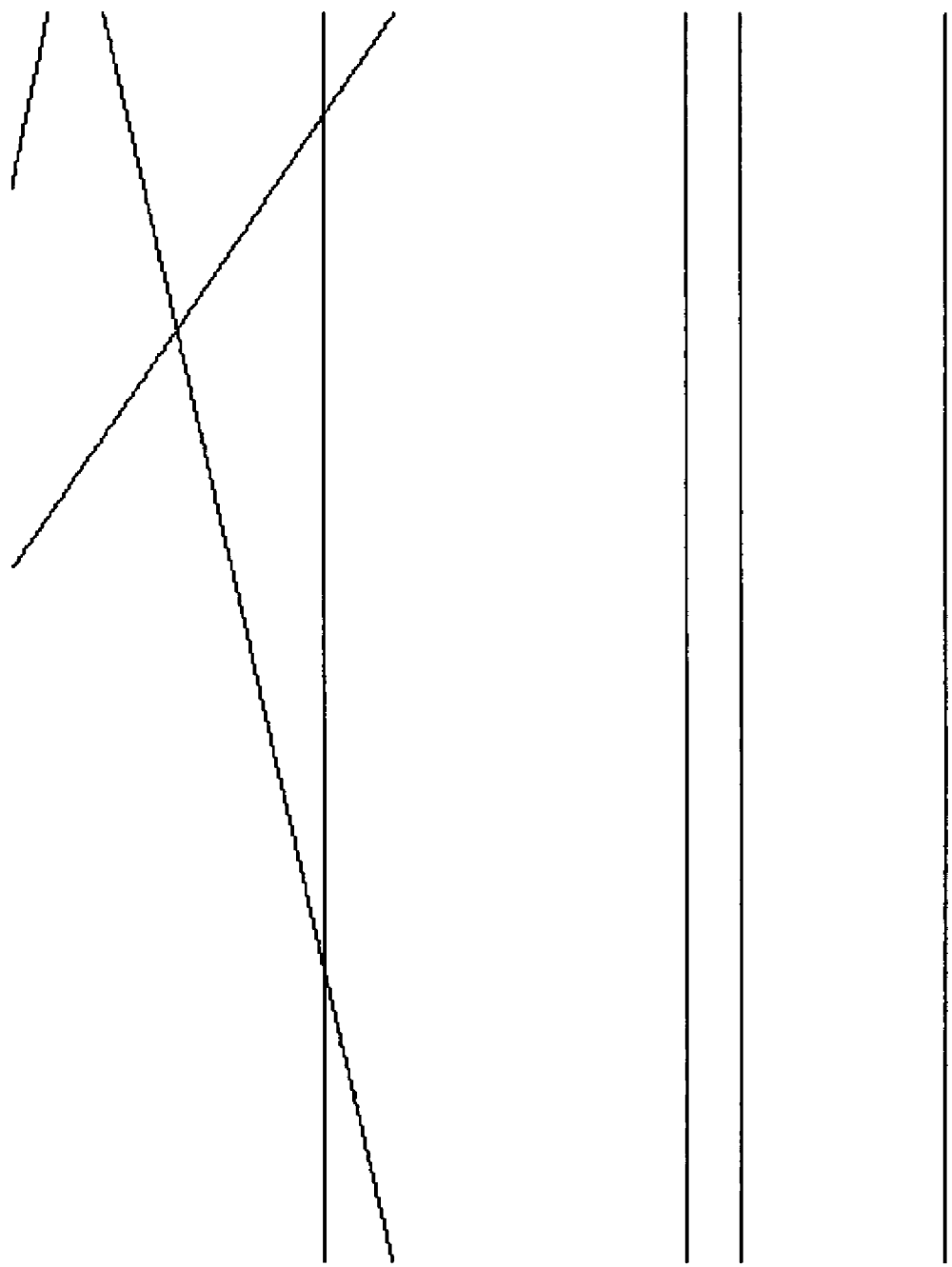
Figure 5D:
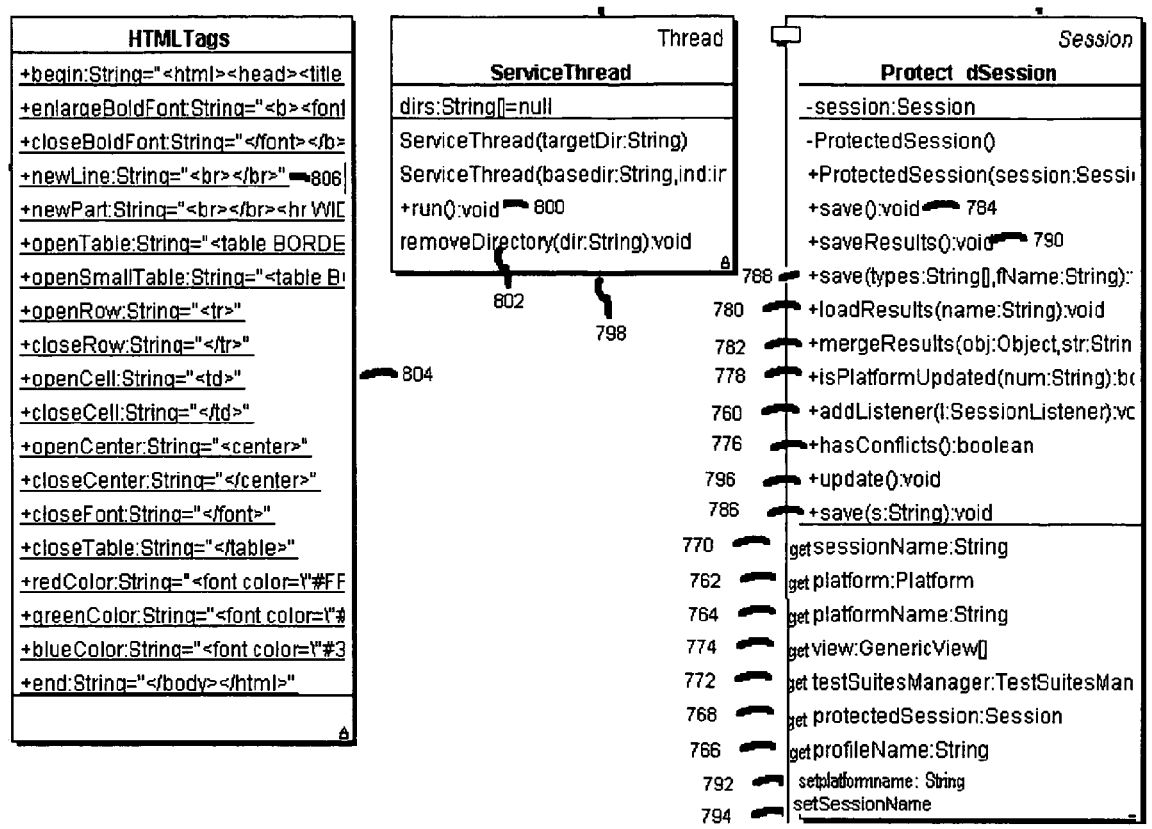
Figure 5D:
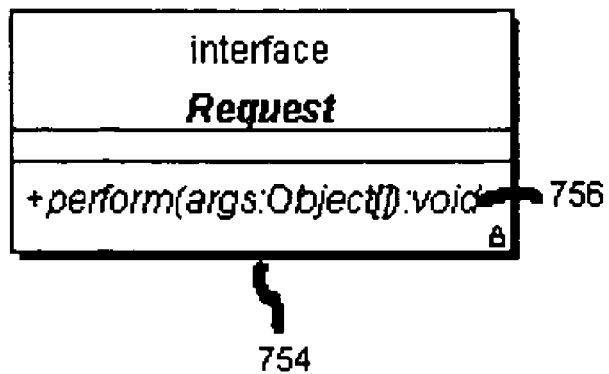
Figure 5E:
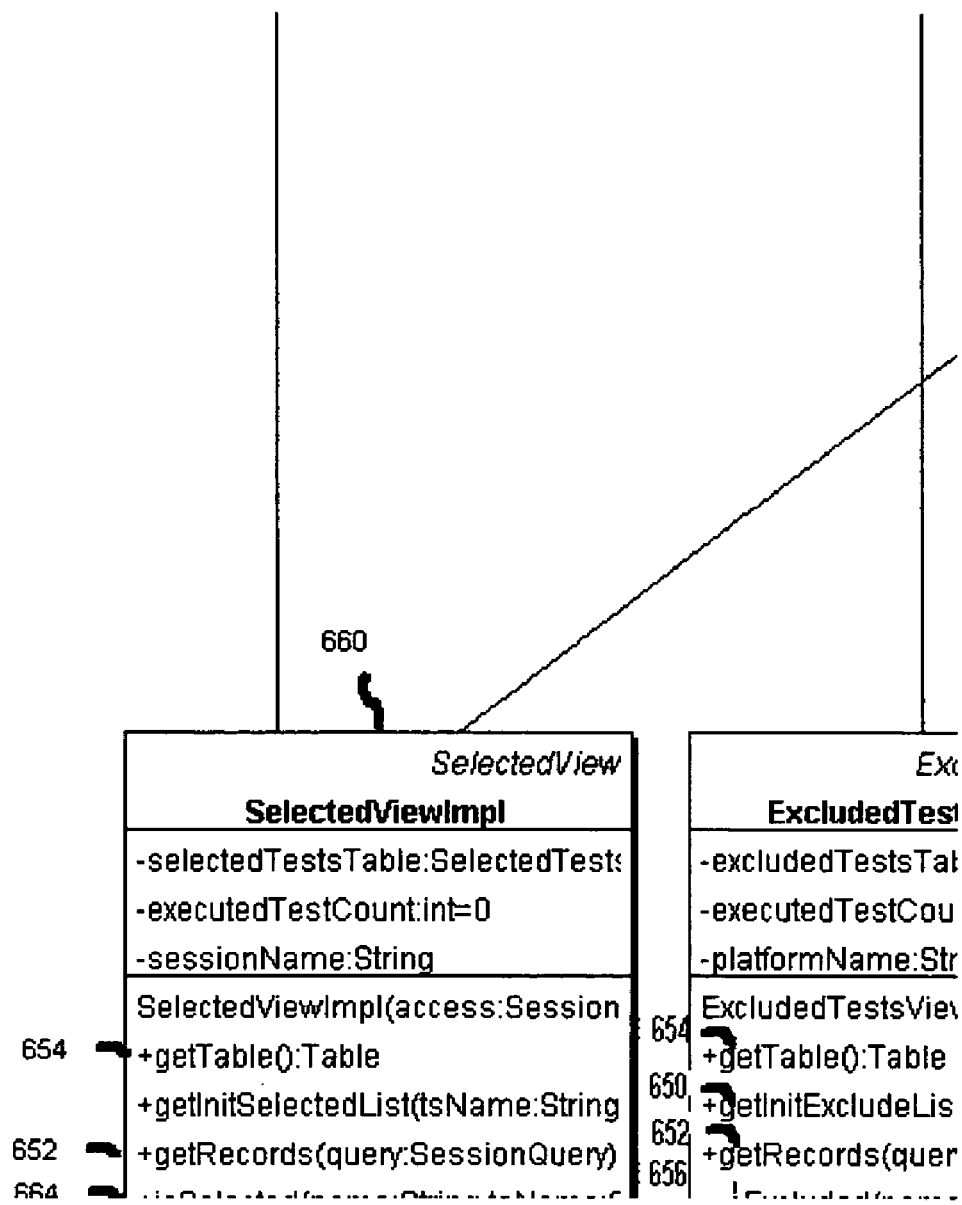
Figure 5E:
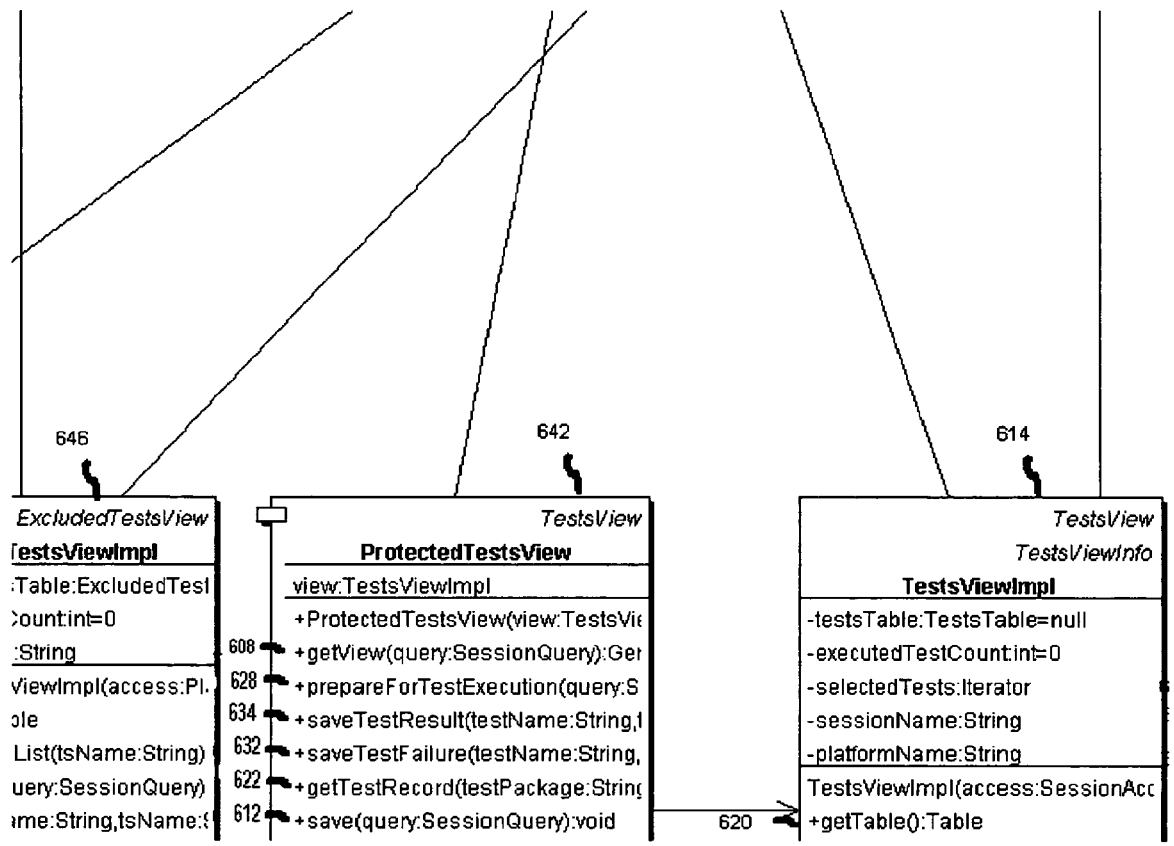
Figure 5E:
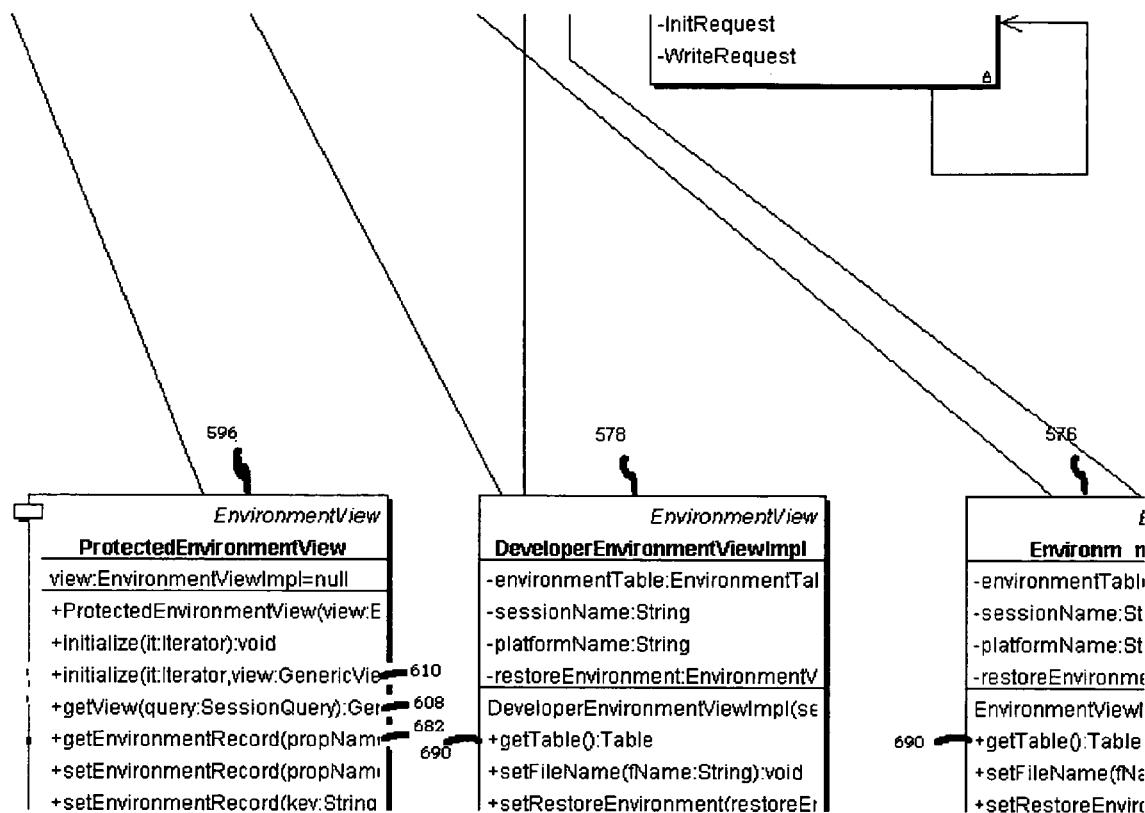
Figure 5E:
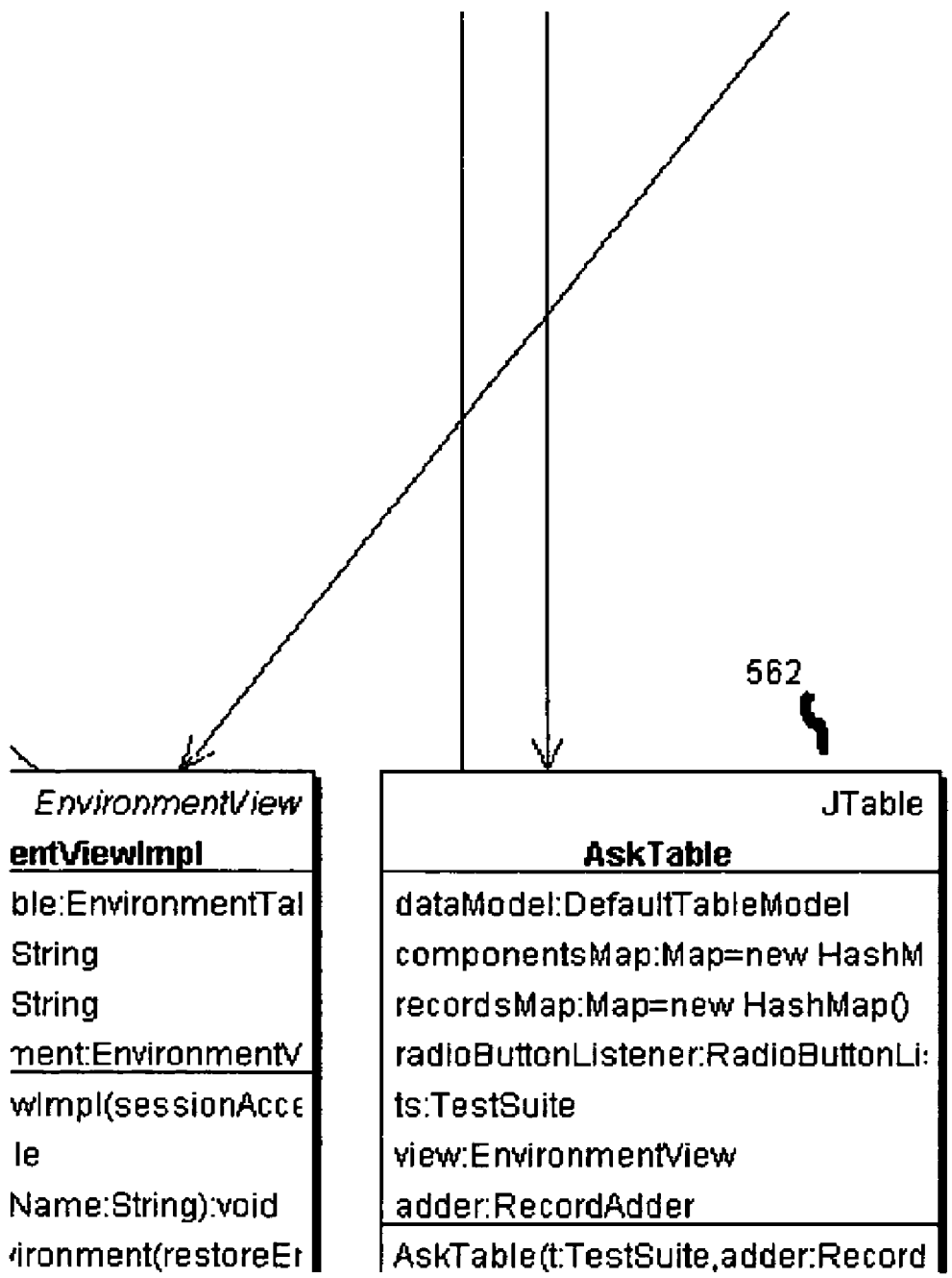
Figure 5E:
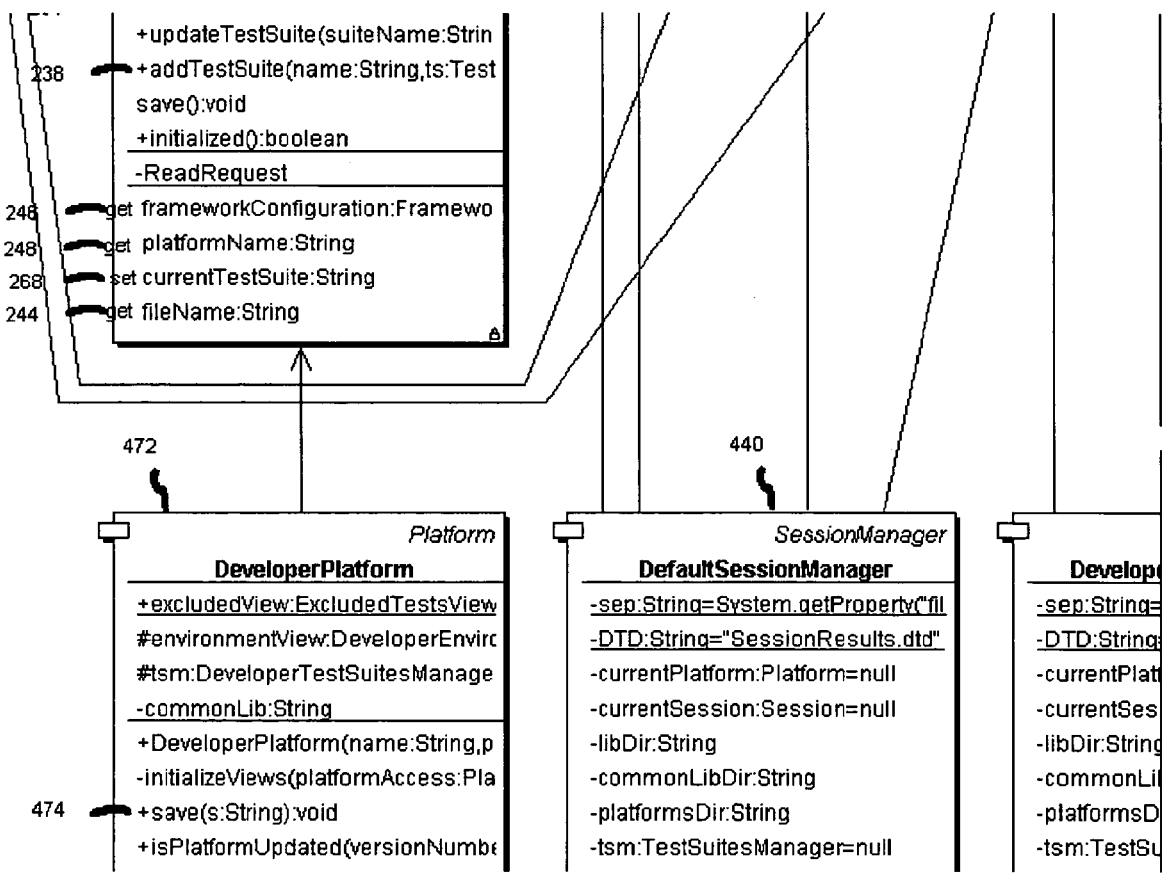
Figure 5E:
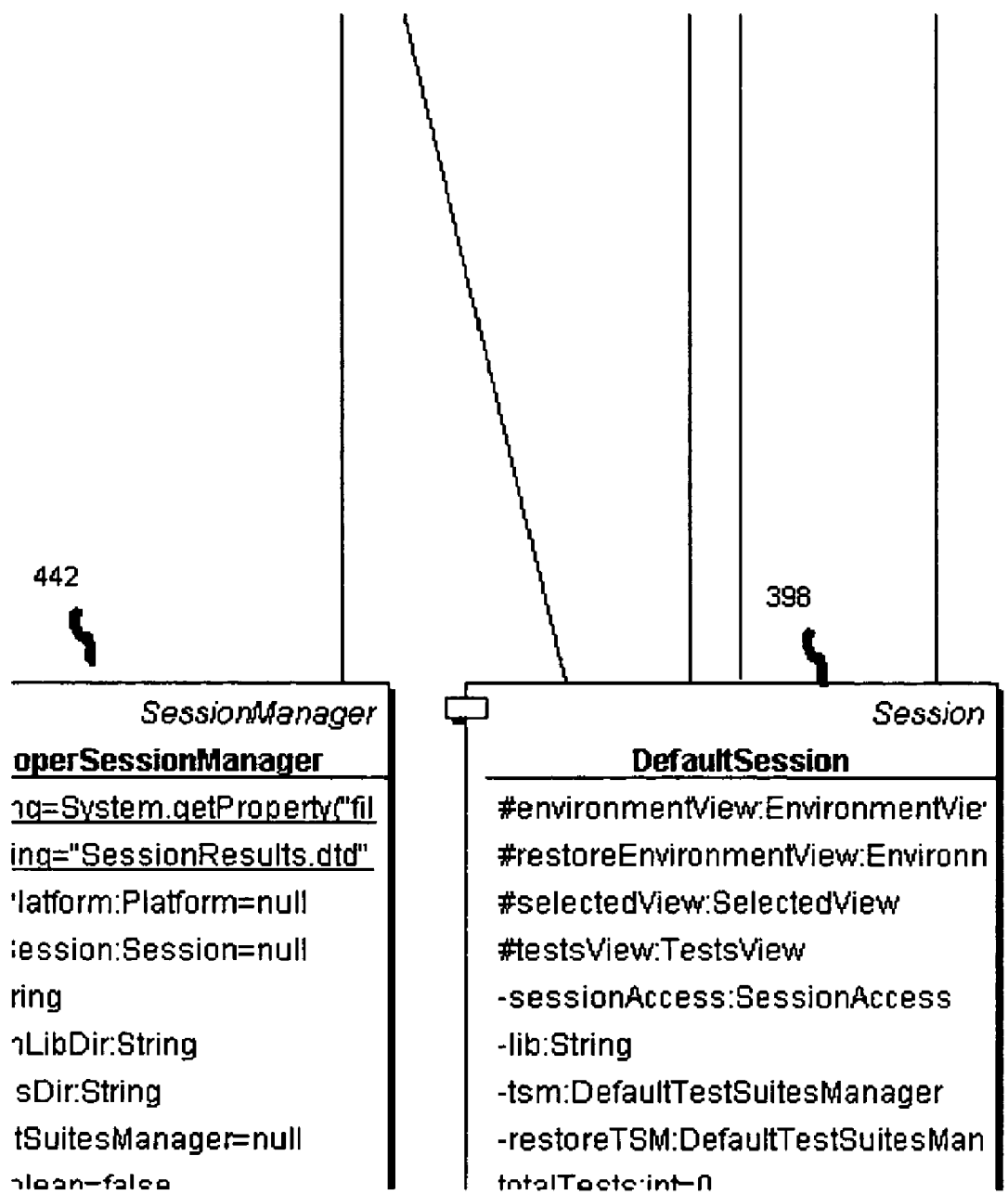
Figure 5F:
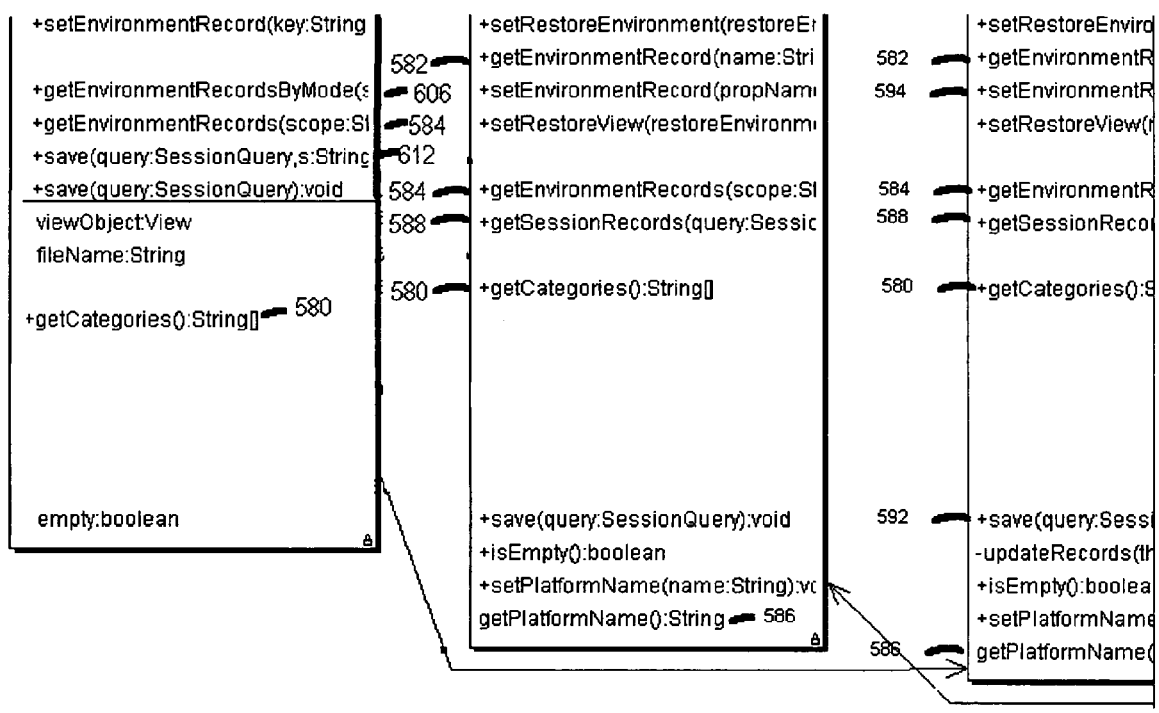
Figure 5F:
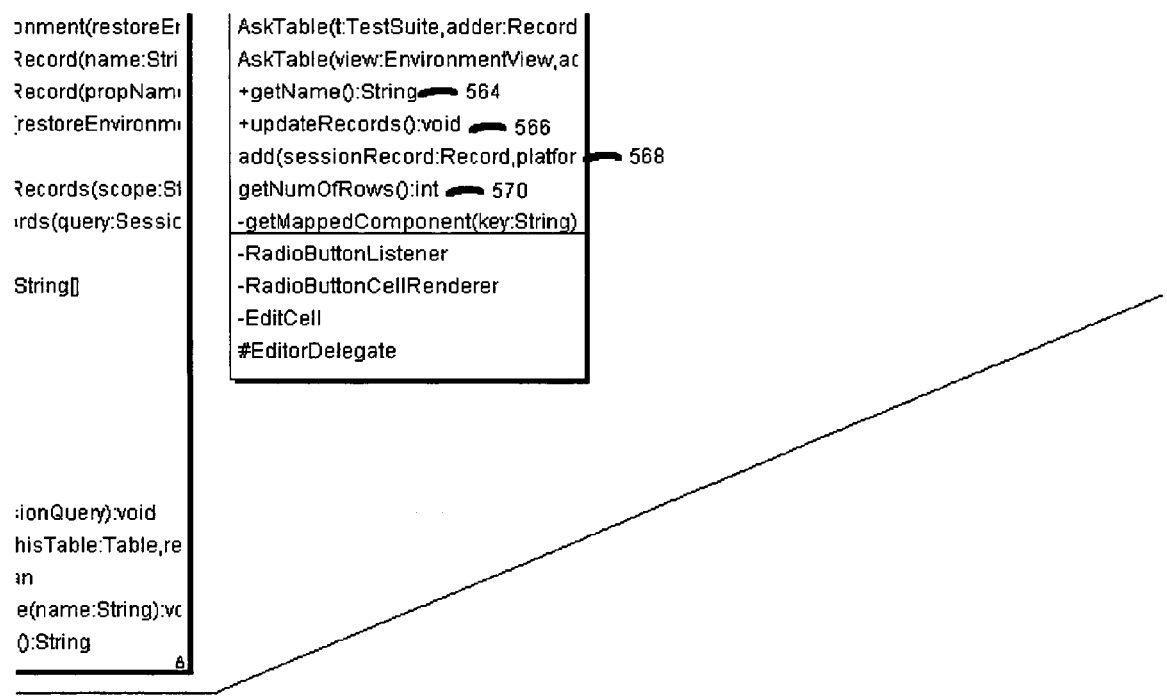

Reference is now made to FIG. 4, which is a flow chart illustrating aspects of a method of conflict resolution in accordance with a disclosed embodiment of the invention. The process illustrated in FIG. 4 is disclosed with further reference to FIG. 1 and FIG. 2.

At initial step 76, the administrator 26 opens a platform of the central repository 12, using the platform editor 28, using a method.

Next, at step 78, a backup copy of the platform (class Platform 38). A copy of the test suites manager (class TestSuitesManager 40) is prepared, which is useful for comparing the values of properties before and after their changes, and for updating the COUNTER and MODIFIED fields of the class record 60.

Next, at step 80, properties are changed by the administrator 26.

Next, at step 82, the modified platform, and the backup copy of the test suites manager are saved to the central repository 12. It will be noted that any changes made to the class TestSuitesManager 40 properties during step 80 are now effectively nullified. The save methods invoked in step 82 also updates the COUNTER and the MODIFIED fields of the class record 60, by comparing values of the modified record before and after the changes. Properties held in the tables of the table TestSuiteTable 50 and the table EnvironmentTable 52 are saved after they are resolved by a class RecordAdder, which is shown in further detail in Listing 7 and Listing 8. The class RecordAdder compares values of the properties and adds them to tables of the table TestSuiteTable 50 and the table EnvironmentTable 52 after the process of updating and conflict resolution has completed. The values are then saved into a session XML file.

The process then ends at final step 84. Further details of the implementation of the process shown in FIG. 4 are given in Listing 6.

The client 34 may also make property modifications, using the method disclosed with reference to FIG. 4, except that the modifications are made on the session object (class Session 46), instead of the platform object. The details are not repeated in the interest of brevity.

Conflict Resolution—Automatic and Manual Aspects.

Assuming that some properties at the client and the server were changed as described above, in order to determine the presence of conflicts and to resolve them, the procedure shown in pseudocode in Listing 7 is performed. As shown in Listing 8, implementation of a class RecordAdder is actually the core of the mechanism.

If it is determined from the operations conducted according to Listing 7 and Listing 8 that some property is in conflict, then the system provides a Wizard to the user that displays the conflicting property and its values. The user is invited to select one of the conflicting values. The selected value is added to a table of the class TestSuiteTable 50 or the table EnvironmentTable 52. The default choice is the platform-provided value.

Implementation.

Reference is now made to FIG. 5, which is a detailed class diagram implementing the system 10 (FIG. 1), in accordance with a disclosed embodiment of the invention. FIG. 5 generally includes the classes shown in FIG. 2 in further detail as well as derived classes and interfaces. The same classes in FIG. 5 and FIG. 2 are sometimes referenced by different reference numerals in FIG. 5, in order to disclose variants and subclasses more clearly.

Table.

A general access to tables is provided by a table access interface TableDataAccess 90, which includes several methods for managing table contents. A method add 92 adds a record to a specified table. The added record is an instance of an abstract record class, which is disclosed hereinbelow. A method clean 94 deletes table elements. A method getElementAt 96 returns the value of an element in the table that is specified by an index parameter. A method isEmpty 98 determines if the table is empty. A method setElementAt 100 sets a value for an element of a specified table.

The interface TableDataAccess 90 relates to a class Table 102, which is an abstract class representing a generic table in the session database. A number of useful fields are defined in the class Table 102. A field dataID 104 identifies the data in the table. Whenever the table content is changed, a counter is incremented. Iterators maintain a snapshot of the data identified by the field dataID 104 dataID for purposes of data validation. An example of such an iterator is provided by a method getRecords 106, which sequentially retrieves all the records from the table. Another example is a method filterRecords 108, which sequentially retrieves all the records from the table, according to filtering criteria set by the user.

Links to other classes that relate to or access the class Table 102 are present. For example, a field recordAdder 110 holds a link to a class recordAdder, which is disclosed hereinbelow. In another example, a field TableDataAccess 112 holds a link to an instance of the interface TableDataAccess 90. The methods of the class Table 102 include a method addRecord 114, which appends a new record to the end of the table. Another method used for record addition to a table is a method completeRecords 116, which adds only those records that are present in the platform and in a current session. A method computeKey 118 determines the key of a specified record. A method deleteRecord 120 functionally removes a record from the table. However, instead of actual removal the current implementation marks the record ID in order to add it to a list of deleted records. Later, the above-noted iterators determine whether the next record is included in the list of deleted records, and if so, such a record is not processed. As a result, the deleted record is not included in report documents, such as session or results report documents. The next time the session is loaded, such a deleted record is actually deleted. A method free 122 clears table data. A method getRecordsCount 124 counts all undeleted records in the table. A method getAllRecordsCount 126, used by the iterators, counts all the records in the table, including deleted records. A method getKeywords 128 returns a list of available keywords in the table. A method getRecord 130 returns a record from the table according to a record index. A method getRecordIndex 132 supplies a record index in the table based on a unique key of a record. The method getRecordIndex 132 offers a rapid way to search the table, but must be used with caution, as it is not guaranteed that an index continues to point to the same record after the table changes, for example after a record has been removed. A method searchRecord 134 returns a record from the table based on its unique key. A method updateRecord 136 updates a table record that is specified by its record index.

Listener.

An interface ListenerNotifier 138 delegates listener notification functionality to certain session classes as detailed hereinbelow. A method notifyListeners 140 notifies listeners of a session event. Many of the classes disclosed with reference to FIG. 5 implement the interface ListenerNotifier 138.

Test Suite Management.

A class XMLAccessManager 142 is responsible for managing a queue of file operations that are requested by a user, and has the following methods: A method startGroup 144 collects components that may be needed to satisfy a request. For example, a list of included tests and excluded tests could be collected from the class Session 46. A method dispatch 146 adds an action request to be executed to the queue. A method run 148 initiates execution of a thread corresponding to an action request at the head of the queue.

An interface RunnableRequest 150 relates to the class XMLAccessManager 142. The interface RunnableRequest 150 is implemented by each operation of the class XMLAccessManager 142. It has a method cancel 152, which cancels a pending request. A method getRequestName 154 returns an identification of a pending request. A method getType 156 returns a category of a pending request. A method isFinished 158 returns a Boolean value that indicates whether a request has completed.

A class ThreadsQueue 160 represents a queue of action requests executed as threads, and has the following methods. A method enqueue 162 inserts a new request into the queue. A method dequeue 164 returns the next pending request from the queue. A method getIterator 166 returns a record iterator appropriate to a current action request.

A class DefaultTestSuitesManager 168 is responsible for managing test suites, and has the following methods: A method setRecordAdder 170 sets a component responsible for adding properties to a test suite. A method setRestoreTSM 172 sets a test suite that stores information before any changes are made to the test suites. When saving the current session and platform, test suites being saved are compared to this test suite to determine changes made during the current session. A method getFrameworkConfiguration 174 returns configuration information for the test framework. A method readTestSuites 176 reads the test suites from current platform and session files. A method getPlatformName 178 returns the name of the current platform. A method setSessionParameters 180 sets configuration parameters for a current session. A method registerTestSuites 182 reads test suites from the platform file. The method registerTestSuites 182 is invoked during the creation of a new session. It reads test suite properties from storage and registers these with the new session. A method updateTestSuites 184 updates test suites in the current platform of an existing session according to information stored in test suite information files. A method setCurrentTestSuite 186 sets the test suite currently being executed. A method getcurrentTestSuite 188 returns the test suite currently being executed. A method addListener 190 adds a specified test suites manager listener to receive action events from a test suites manager implementation object. A method removeListener 192 removes a specified test suites manager listener so that it no longer receives test suites manager events from the current test suites manager. A method fireEvent 194 sends test suites manager events to the current test suites manager, which notifies its listeners in turn. A method setPlatformName 196 changes the name of the current platform, and associates the current platform name with all test suites. A method register-TestSuite 198 adds a test suite to be handled by the current test suites manager. A method listOfTestSuiteNames 200 returns a list of test suite names being handled by the current test suites manager. A method notifyListeners 202 notifies listeners on an appropriate view event, for example a change in the state of a displayable object. A method removeTestSuite 204 removes a specified test suite. A method addTestSuite 206 adds a specified test suite to the list of test suites. A method save 208 saves the test suites to the current platform file.

A class DefaultPlatform 210 relates to the class DefaultTestSuitesManager 168. It provides access to platform data of a current session. For example, MIDP and MIDP-for-Palm are typical test platforms. Platform data includes test suites associated with the current test platform and persistent environment information. The class DefaultPlatform 210 has the following methods. A method is PlatformUpdated 212 compares version numbers of a default configuration and default platform, returning a Boolean value that indicates whether the current platform has been updated. A method getPlatformName 214 returns the name of the current platform. A method setPlatformName 216 changes the name of the current platform. A method getView 218 returns a requested view as specified by a view type. A method getTestSuitesManager 220 provides access to the test suites manager associated with the current platform. A method getprotectedPlatform 222 restricts access to the current platform. A method save 224 saves the platform associated with the current profile. A method getProfileName 226 returns the name of the test suite record profile with which the current platform is associated. A method update 228 updates the content of the current platform.

A class DeveloperTestSuitesManager 230 is responsible for managing test suites, and relates to the class XMLAccessManager 142 and a class DeveloperSession 232. It has the following methods. A first method addListener 234 adds a session listener. A second method addListener 236 adds a specified test suites manager listener to receive action events from a TestSuitesManager implementation object. A method addTestSuite 238 adds a test suite specified by name to a list of test suites. A method fireEvent 240 sends a test suites manager event to the current test suites manager, which notifies its listeners in turn. A method getFileName 244 is used in the current test suite to obtain the name of a XML file that it should write or read. A method getFrameworkConfiguration 246 returns current configuration information about the test framework. A method getPlatformName 248 returns the name of the current platform. A method getTestSuite 250 returns a test suite object specified by its name. A method getXMLAccessManager 252 returns the current XML access manager as an instance of the class XMLAccessManager 142. A method listOfTestSuiteNames 254 returns a list of test suite names being handled by the current instance of the class DeveloperTestSuitesManager 230. A method notify 255 notifies listeners on a test suites manager event. A method notifyListeners 256 notifies listeners on a session view event. A method registerTestSuite 258 adds a test suite that would be handled by the current instance of the class DeveloperTestSuitesManager 230. A method readTestSuites 260 reads test suites from the current platform file. A method removeListener 262 removes a specified test suites manager listener, so that it no longer receives test suites manager events from the current instance of the class DeveloperTestSuitesManager 230, A method removeTestSuite 264 removes a specified test suite from the list of test suites being managed by the current instance of the class DeveloperTestSuitesManager 230. A method searchTestSuiteName 266 locates a specified test suite in a current list of test suites. A method setCurrentTestSuite 268 designates a test suite to be executed.

FIG. 5 illustrates further details of the above-noted class record 60. An instance of the class record 60 represents a single record of a table. The class record 60 has a method getField 272, which returns a field specified by a field index. A method getFieldIndex 274 returns a field index corresponding to a field name. A method getFieldNames 276 returns the names of fields specified by one or more field indices. A method getValue 278 returns the value of a test record field that is specified by a field index. A method setField 280 sets the contents of a field specified by a field index. A method setValue 282 sets the value of a field specified by a field index. A method size 284 returns the size of a record. A method toString 286 creates a string representation of a record.

A class TestRecordImpl 288 relates to the class record 60 and holds information concerning tests in test suites. It has a method clone 290, which returns a copy of a specified test record.

A class ExcludedRecordImpl 292 relates to the class record 60 and holds information concerning tests in excluded test suites. It has a method clone 294, which returns a copy of a specified excluded record.

A class TestSuiteRecordImpl 296 relates to the class record 60 and is adapted for test suite records. It has a method clone 298, which returns a copy of a specified test suite record. A method getTSName 300 returns the name of the test suite to which a test suite record belongs. A method getValue 302 returns the value of a test record field that is specified by an index value. A method setValue 304 sets the value of a test record field that is specified by an index value.

A class EnvironmentRecordImpl 306 relates to the class record 60 and is adapted for environment records, which contain fields and field value retrieval methods. It has a method clone 308, which returns a copy of a specified environment record.

A class SelectedRecordImpl 310 relates to the class record 60 and is adapted for selected tests, each of which represent the name of a test or a package that were selected in a session. It has a method clone 312, which returns a copy of a specified selected record.

A class DefaultHTMLReport 314 generates a test execution report in HTML format. Its principal function is a method writeHTMLreport 316, which processes page generation in HTML format. It returns the value true if a report has been successfully generated.

A class FilterIterator 318 relates to the class record 60. The class FilterIterator 318 enables iteration of records in a table by filtering, and is used as a wrapper of other record iterators. It has the following methods. A method currentRecordID 320 a session table identifier of a current record, typically retrieved by the methods next or previous, which are disclosed in further detail hereinbelow. A method skipForward 322 skips a specified number of records in a forward iteration. A method skipBackward 324 skips a specified number of records in a backward iteration. A method hasPrevious 326 returns the value true if a reverse iteration has more records. A method previous 328 returns the previous record in a record iteration. A method hasNext 330 returns the value true if a forward iteration has more records to be accessed. A method next 332 returns the next record in a record iteration. A method remove 334 removes a specified record.

A class XMLAccess 336 is a utility class for reading and writing session and platform data in the well-known XML format. It includes the following methods. A method write 338 writes a specified test suite, or other records of a specified type to a XML file. A method notifyListeners 340 notifies listeners on an appropriate view event. A method read 342 reads file content of a specified type into a linked list of records. A method merge 344 merges a list of files into a single output file.

A class EnvironmentBuilder 346 is a utility class, which configures the platform and session environment. The class EnvironmentBuilder 346 loads an environment configuration file into memory, and provides the following methods for extracting information regarding the environment. A method buildEnvironmentRecords 348 generates a linked list of records containing environment information. A method getAllRecords 350 returns all environment records as a linked list. A method getPlatformRecords 352 returns platform environment information as a linked list of records. A method getSessionRecords 354 returns session environment information as a linked list of records.

The class DeveloperSession 232 provides access to session data of the current session. The class DeveloperSession 232 is built on the current platform, and is responsible for handling data that is specific to the current session, such as session environment modification, test suite environment modification, and test selection. It has the following methods: A method addListener 356 adds a listener to session events. A method getPlatform 358 returns the platform on which the current session relies. A method getPlatformName 360 returns the name of the current platform. A method getProtectedSession 362 restricts access to the current session. A method getSessionName 364 returns the name of the current session. A method getTestSuitesManager 366 provides access to the current platform test suites manager, for example an object of the class DefaultTestSuitesManager 168. A method getView 368 returns an appropriate view based on a specified view type. A method hasConflicts 370 determines if there are conflicts in current session and platform properties. A method loadResults 372 loads results of the current session. A method mergeResults 374 merges a list of results into one result file. A method notifyListeners 376 notifies listeners on an appropriate view event. A method save 378 saves the current platform. A method saveResults 380 saves results of the current session. A method setPlatformName 382 changes the name of the current platform. A method setSessionName 384 changes the name of the current session. A method update 386 updates content of the current platform.

A class SessionAccess 388 provides access to information about the current session of the test framework, and relates to the class DefaultTestSuitesManager 168, the method clone the class XMLAccessManager 142, and the class DeveloperSession 232. It has a method setCurrentSession 390, which specifies the current session by name.

A class PlatformAccess 392 provides access to information about the current platform, and relates to the class XMLAccessManager 142. It has a method setCurrentPlatform 394, which sets the current platform according to a specified name. A method addSessionAccess 396 returns an instance of the class SessionAccess 388 to the caller.

A class DefaultSession 398 provides access to session data of a current session, and is responsible for handling data specific for the current session, such as environment modification, test suite environment modification, and test selection. It has the following methods. A method addListener 400 adds a listener on session events. A method getPlatform 402 returns the platform on which the current session is built. A method getPlatformName 404 returns the name of the current platform. A method getProfileName 406 returns the name of the test suite record profile with which the current platform is associated. A method getProtectedSession 408 restricts access to the current session. A method getSessionName 410 returns the name of the current session. A method getTestSuitesManager 412 provides access to the test suites manager of the current platform. A method getView 414 returns a view based on a specified view type. A method hasConflicts 416 returns the value true if there are conflicts in session and platform properties. A method isPlatformUpdated 418 returns a Boolean value that indicates whether the current platform has been updated. A method loadResults 420 loads results of the current session. A method mergeResults 422 merges multiple result files into one file. A method notifyListeners 424 notifies listeners on a specified view event. An overloaded identifier designates methods save 426, 428, 430. The method save 426 saves the session, including its tests, environment and test suites. The method save 428 saves the current platform. The method save 430 saves test execution results according to their type, e.g., passed, failed. A method saveResults 432 saves results of the current session. A method setPlatformName 434 changes the name of the current platform. A method setSessionName 436 changes the name of the current session. A method update 438 updates content of the current platform.

A class DefaultSessionManager 440 manages all session and platform related operations in the test framework, and has the following methods. A class DeveloperSessionManager 442 is similar to the class DefaultSessionManager 440, but is adapted for use by commercial software developers. Both classes have the following methods. A method createPlatform 444 creates new platform. A method createSession 446 creates a new session based on the current platform. A method getAvailablePlatformsNames 448 searches for existing platforms. A method getAvailableSessionNames 450 searches for existing sessions for the current platform. A method getTestSuitesManager 452 returns a test suites manager object for those test suites that are associated with the current platform. A method getUIComponent 454 returns user interface implementation of the test framework. A method loadResults 456 loads previous tests result from a file. A method mergeResults 458 merges a list of results into one result file. A method openPlatform 460 opens an existing platform. A method openSession 462 opens an existing session. An overloaded identifier designates methods savePlatform 464, 466, both of which save the current platform. A method saveResults 468 saves results of test execution, including current configuration information, e.g., environment, and test configuration information. An overloaded identifier designates a method saveSession 470, which saves the current session.

A class DeveloperPlatform 472 is similar to the class DefaultPlatform 210, but is adapted for commercial software development. It has the method getPlatformName 214, the method setPlatformName 216, the method getView 218, the method getProtectedPlatform 222, and the method update 228. An overloaded identifier designates the method save 224 and another method save 474. The method save 474 saves the platform configuration by saving each view.

The class DeveloperPlatform 472 also has a method getTestSuitesManager 476, which provides access to the platform test suites manager.

Extensions and Subsidiary Classes.

The class Table 102 relates to a class ComparisonTable 478, which reads two session results and creates a table, which is a comparison of the two.

A class DefaultResultsComparator 480 relates to the class ComparisonTable 478, A method getComparisonRecords 482, returns a list of all comparison records, or a subset of comparison records according to a prefix pattern.

The class Table 102 relates to a class SelectedTestsTable 484, which holds the tests that are selected in a current session. The class SelectedTestsTable 484 has the following methods: A method computeKey 486 computes a key for a test record package, or computes an equivalent TestRecord key based on a package, class and test case name. A method createRecord 488 creates a specified record.

The class Table 102 relates to a class ExcludedTestsTable 490, which holds the tests that are excluded in a current session. The class ExcludedTestsTable 490 has the methods 486, 488.

A class TestsTable 492 extends the class Table 102, and has the following methods: A method addRecord 494 overrides the method addRecord of the superclass, that is the class Table 102, in order to generate counting events, which may result in a counter being incremented in another class. The class TestsTable 492 has the methods 486, 488.

The class Table 102 relates to a class ProtectedView 496, which protects write access to the current platform. The class ProtectedView 496 has the following methods: A method addListener 498 adds a session listener. A method countRecords 500 counts the number of records in a class view 502, which is disclosed hereinbelow. A method getRecord 504 returns a view record that is identified by its unique ID. A method getRecords 506 returns all view records according to filters specified in a session query. If a session query is not specified, or the value null is supplied, then all records are retrieved by the method getRecords 506. A method getViewObject 508 returns an object type of the class view 502. A method initialize 510 initializes a linked list of records. A method notifyListeners 512 notifies listeners on session events. A method removeListener 514 removes a session listener. A method removeListeners 516 removes all registered listeners. A method setRestoreView 518 restores an environment view. The class representation of an environment view is disclosed hereinbelow.

The class Table 102 relates to the above-mentioned class view 502, which provides basic access to the session table records. It is extended by other views, as disclosed herein, and has the following methods. A method addListener 520 adds a session listener. A method getFrameworkConfiguration returns the configuration of the test framework. The class view 502 has the method countRecords 500, the method getRecords 506, the method removeListeners 516, and the method notifyListeners 512. A method getTable 522 returns a reference to a table of a subclass. A method getView 524 creates a virtual view, which is a subset of a View based on a session query. If no session query is specified or the value null is supplied, a reference to the current view is returned. A method initialize 526 initializes the environment table of the current session, and in a variant, initializes the appropriate table of the current session. A method initializeTable 528 registers a request for initializing a table based on a linked list. A method read 530 processes a request to read from a view.

A class EnvironmentTable 532 extends the class Table 102, and is used to provide view of records of known platform environments. It has the method computeKey 486, the method createRecord 488, the method free 122, and the method searchRecord 134 Additionally, a method getEnvironmentRecords 534 returns an environment record from a table. A method getExecutionMode 536 returns a current execution mode.

A class TestSuiteImpl 538 extends the class Table 102, and. The class TestSuiteImpl 538 encapsulates information about a particular test suite, e.g., its properties and name. It has the method computeKey 486, the method createRecord 488 and a method addRecord 540. Additionally, a method setRecordAdder 542 sets a component responsible for adding properties to a test suite, and overrides a method setRecordAdder in the class Table 102. A method setRestoreTestSuite 544 sets another instance of a test suite for the purpose of properties comparison when saving the test suite later. A method getCategories 546 returns a list of categories of the current test suite. A method getTestSuiteRecords 548 returns records that belong to a specified category. If the value null is passed to the method getCategories 546, then only those records that belong only to the current test suite are returned. A method getRecordsByScope 550 returns records according to a specified scope, for example, whether the record is available in the platform editor 28 (FIG. 1), or at the client. A method testSuiteUpdated 552 updates a specified test suite according to values passed to the method. A method getTestSuiteProperties 554 returns the properties of a test suite as a properties object. A method getTestSuiteProperty 556 returns a requested test suite property according to a specified test suite key. A method save 558 saves the current test suite as a XML file.

A class RecordAdder 560 relates to the class Table 102, and has methods adapted to the addition of records to a table. The class RecordAdder 560 determines if a record was administratively modified by the platform editor 28 (FIG. 1) and also modified by the user at the test console, or if it was modified only in one of them. If the record was modified in both components, then it is added to a table AskTable, which is described hereinbelow. The table AskTable is later used in order to ask the user which modified value to accept. Otherwise, if the record was modified only in the platform editor 28 (FIG. 1), then the administrative value is accepted automatically. If the record was modified only by the user, then the user's modification is accepted. Some methods of the class RecordAdder 560 return an object of type AskTable, as described with reference to a class AskTable 562.

The class AskTable 562 is used to manage a table for representing conflict data in the session and platform. It inherits methods from a standard Java class java.awt.Container, and two J2SE Java classes, javax.swing.Jtable and javax.swing.Jcomponent, available from Sun Microsystems, Inc. Additionally, the class AskTable 562 has a method getName 564, which returns the name of a current table. A method updateRecords 566 updates records according to the outcome of conflict resolution and record merge activity. A method add 568 adds a record to a current table. A method getNumOfRows 570 returns the number of rows in a current table.

The interface TableDataAccess 90 relates to a class DirectDataAccess 572, which offers direct random and sequential access to a table. The class DirectDataAccess 572 inherits the methods 92, 94, 96, 98, 100 from the interface TableDataAccess 90.

The interface TableDataAccess 90 relates to a class PagedDataAccess 574, which offers paged random and sequential access to a table. The class PagedDataAccess 574 inherits the methods 92, 94, 96, 98, 100 from the interface TableDataAccess 90.

Views.

A class EnvironmentViewImpl 576 provides a view of environment records in a session, and has the following methods. A class DeveloperEnvironmentViewImpl 578 is similar to the class EnvironmentViewImpl 576, but is adapted to use by commercial software developers. Both classes have the following methods. A method getCategories 580 returns a list of categories in the current test suite. A method getEnvironmentRecord 582 returns an environment record that is specified by name. A method getEnvironmentRecords 584 returns an environment record from a table as specified by a record index. A method getPlatformName 586 returns the name of the current platform. A method getSessionRecords 588 returns session environment information as a linked list of records. A method getTable 590 returns a requested table. A method save 592 saves the content of the table associated with a current view. A method setEnvironmentRecord 594 saves an environment record.

A class ProtectedEnvironmentView 596 protects write access to an environment view, and has the method getCategories 580, the method getEnvironmentRecord 582, and the method getEnvironmentRecords 584. A method getView 608 creates a virtual view, which is a subset of the current view based on a session query. If the query is not specified or if the value null is supplied, a reference to the current view is returned. A method initialize 610 initializes a specified table of the current session. A method save 612 saves the current view as a XML file.

A class TestsViewImpl 614 represents a session view of test records, and has the following methods. A method availableExecutionStatuses 616 returns a list of execution statuses in the current session. Generally, these are obtained from an immediately prior test execution. If a subset of tests is being rerun, then the list of statuses remains unchanged from the prior test suite execution. A method availableKeywords 618 returns a list of keywords available in the current session. Keywords are strings assigned to each test according to its type. For example, an interactive test has an "interactive" keyword. A method getTable 620 returns a requested table. A method getTestRecord 622 returns a test record that is specified by its package, class and case name. A method getTestsViewInfo 624 returns test view information. A method initialize 626 initializes a table of the current session. A method prepareForTestExexcution 628 enables the current session to perform necessary initialization prior to test execution. A method save 630 saves content of a table of the current view. A method saveTestFailure 632 saves a test failure report for a test that is specified uniquely by name, class and package. A method saveTestResult 634 saves a test result report, which is further specified by test name, class and package in order to provide a unique identification of the test result in binary form. A method setFileName 636 sets the name of the session for the current view. A method setPlatformName 638 changes the name of the current platform. A method setSelectedTests 640 is an iterator of selected tests to be saved directly as a XML file.

A class ProtectedTestsView 642 protects write access to a test view, and has the method getView 608, the method initialize 610, the method save 612, the method getTestRecord 622, the method prepareForTestExecution 628, the method method saveTestFailure 632, the method saveTestResult 634, the method setFileName 636, the method setSelectedTests 640, and also has a method getTestsViewInfo 644, which returns requested tests view information.

A class ExcludedTestsViewImpl 646 provides a session view of excluded test records, and has the following methods. A method generateExcludeRecord 648 returns a record of a test that was selected to be excluded from a test suite. A method getInitExcludeList 650 returns a linked list of tests that are excluded from performance in a current test suite. A method getRecords 652 returns all view records using filters specified in a session query. A method getTable 654 returns a reference to a table of a subclass. A method isExcluded 656 tests for the existence of a test having a specified name in the excluded test list of the current session. A method performExcludeTransaction 658 adds excluded tests to the excluded test list, and removes tests that were previously excluded but are no longer excluded from the list. The class ExcludedTestsViewImpl 646 also has the method setFileName 636 and the method setPlatformName 638.

A class SelectedViewImpl 660 provides a session view for the test records, which are not excluded from performance. The class SelectedViewImpl 660 has the method getRecords a805, the method getTable 654, the method setFileName 636. A method generateSelectedRecord 662 returns a record of a specified test. A method is Selected 664 tests for the existence of a specific name in a selected test list of the current session. A method performSelectTransaction 666 adds selected tests to the selected test list, and removes tests that were previously selected but are no longer selected from the list.

RecordIterator.

The class Table 102 relates to an interface RecordIterator 668, which has several implementing classes. It includes methods, which are replicated in the classes. For example, a method skipForward 670 and a method skipBackward 672 skip records in forward and backward directions, respectively.

A class BaseIterator 674 enables iteration of records, even if the vector, which is the list of records, is under current modification). Methods of the class BaseIterator 674 include a method currentRecordID 676, which returns the position of a current record in the table.

A class ReverseIterator 678 enables reverse iteration. This is done through caching iterated record ID's. The records can also be iterated in a forward direction as well, until the all the cached ID's limit have been processed. The class ReverseIterator 678 has the method currentRecordID 676, the method skipForward 670 and the method skipBackward 672.

A class ExactIterator 680 returns records according to their ID's. The class ExactIterator 680 has the method currentRecordID 676, the method skipForward 670 and the method skipBackward 672.

A class ViewIterator 682 returns specified views, and has the following methods. A method add 684 adds a record to a current list of records to be viewed. A method completed 686 signals completion of view generation in the iteration. A method hasNext 688 returns the value true if a forward iteration has more elements. A method next 690 returns the next element in a view iteration, A method start 692 signals the start of test record collection into a list.

Miscellaneous Classes and Interfaces.

A class MonitorDialog 694 indicates progress of saving or opening a session by displaying a progress bar in a modal dialog box. It is a slow method, and is therefore run in a separate thread. It has a method setDescription 696, which returns a descriptor of the current session. Its principal method is a method run 698, which displays the dialog box and progress bar.

A class RecordInfoImpld 700 provides access to specified records, and has the following methods. A method getRecord 702 returns a specified record object. A method getRecordID 704 returns a record Identifier in the current view. A method is LastTest 706 returns a Boolean value, according to whether the current record is the last of the records selected for test execution.

A class TableDataAccessFactory 708 creates objects of the interface TableDataAccess 90, and has the following methods. An overloaded identifier designates a method create 710 and a method create 712, both of which return objects of type TableDataAccess.

A class TestSuiteInstaller 714 is responsible for the actual installation of a test suite, and has the following methods. A method installTestSuite 716 is the principal method of the class, which installs a designated test suite, and returns an object of type class TestSuiteInstaller 714. A method addListener 718 adds a listener on the event of a test suite installation. A method notifyThis 720 notifies listeners that a test suite has been successfully installed.

A class ProtectedPlatform 722 is responsible for protecting write access to a designated platform, and has the following methods. A method getPlatformName 724 returns the name of the current platform. A method getProfileName 726 returns the name of the test suite record profile with which the current platform is associated. A method getTestSuitesManager 728 provides an access to the test suites manager associated with the current platform. A method GenericView 730 returns the view associated with a specified view type. A method is PlatformUpdated 732 compares version numbers of a default configuration and default platform, returning a Boolean value that indicates whether the current platform has been modified. An overloaded identifier designates a method save 734 and a method save 736, both of which save the current platform. A method setPlatformName 738 changes the name of the current platform.

A class ConflictWizard 740 is responsible for dealing with value conflicts in the current session and platform. Its principal method is a class constructor ConflictWizard 742, which implements a dialog that is shown to the user when the test framework loads in order to resolve values, which conflict in the session and platform. A method notifyListeners 744 notifies listeners on the appropriate view event.

A class TestResultsDecoder 746 has functions for presenting information concerning executed tests. A method getTestComments 748 returns messages generated by the test framework during execution of a current test. A method getTestLog 750 returns contents of a log file generated by the test framework during execution of the current test. A method getTestStatus 752 returns status information concerning the current test.

Requests for test execution are handled via an interface Request 754. It has a method perform 756, which actuates the request in the test framework when an appropriate object is passed as a parameter to the method.

A class ProtectedSession 758 protects write access to a session, and has the following methods. A method addListener 760 adds a listener on session events. A method getPlatform 762 returns the platform on which the current session is constructed. A method getPlatformName 764 returns the name of the current platform. A method getProfileName 766 returns the name of the test suite record profile with which the current platform is associated. A method getProtectedSession 768 returns a reference to a current session having restricted access. A method getSessionName 770 returns the name of the current session. A method getTestSuitesManager 772 provides access to the test suites manager associated with the current platform. A method getView 774 returns a requested view as specified by a view type. A method hasConflicts 776 determines if there are conflicts in current session and platform properties. A method is PlatformUpdated 778 returns a Boolean value that indicates whether the current platform has been updated. A method loadResults 780 results of the current session. A method mergeResults 782 merges a list of results into one result file. An overloaded identifier designates three methods save 784, 786, 788. The methods save 784, 786 save the current platform. The method save 788 saves a session specified by type. A method saveResults 790 saves results of a specified session. A method setPlatformName 792 changes the name of the current platform. A method setSessionName 794 changes the name of the current session. A method update 796 updates content of the current platform.

A class ServiceThread 798 asynchronously removes unused tables, and has the following methods. A method run 800 overrides a method of the same name in the standard Java class java.lang.Thread from which it inherits, and initiates a new thread. A method removeDirectory 802 removes a table by deleting a subdirectory in which it is found. These methods are operative when access to the appropriate object is not restricted.

A class HTMLTags 804 includes HTML tags needed to create a HTML report. In the current embodiment, tags are generated as strings taken from the standard Java class java.lang.String. For example, A method newLine 806 generates a string newLine, which is the string token pair "<br>/br>/".

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

---

COMPUTER PROGRAM LISTINGS

Listing 1

```
class Record {
/** The field for a property name */
public final int NAME = 0;
/** The field for a property value */
public final int VALUE = 1;
/**
* Scope of this property:
* basic or advanced
*/
public final int SCOPE = 2;
/**
* Profile to which this record belongs
* platform or session
*/
public final int PROFILE = 3;
/**
* Logic category of this property
**/
public final int CATEGORY = 4;
/**
* File type of this property
**/
```

---

-continued

COMPUTER PROGRAM LISTINGS

```
public final int TYPE = 5;
/**
* execution Mode to which this record belongs
*/
public final int MODE = 6;
/**
* Execution SubMode to which this record belongs
*/
public final int SUBMODE = 7;
/**
* Documentation available only if this record
* represents category or mode
**/
public final int DOCUMENTATION = 8;
/**
* Description about sub modes available only if this
* record represents mode
**/
public final int DESCRIPTION = 9;
public static final int COUNTER=10;
public static final int MODIFIED=11;
}
```

Listing 2

```
Platform platform =
PlatformSessionManager.createAndSavePlatform(name)
// administrator of the test system
// creates a new platform
In the platform:
TestSuitesManager.WriteRequest (test suites list of Record)
//taken from the test suites directory
EnvironmentView.WriteRequest(parameterslist of Record)
SelectedView.WriteRequest(selected tests list of Record)
//can be selected by the platform editor
//for each request:
XMLAccess.write(Record[ ] records)
```

Listing 3

```
// returns value of the parameter to
// the other components*/
public String getValue(int fieldIndex) {
if (fieldIndex < 0 || fieldIndex >= recordSize)
{
    System.out.println("Invalid index" + fieldIndex);
    return null;
}
else{
    String value = values[fieldIndex];
    if(value!=null &&
        value.indexOf("(PARENT_DIR)")!=-1) {
        //if this parameter should be replaced
        value = session.getFrameworkProperty("parentDir") +
        File.separator +
        value. substring(13);
        //replace the variable PARENT_DIR with it's value //that
        session took from local.configuration file
        value = replaceSeparators(value);
        //convert it's file separator according to the
        //operating system
        return value;
    }
    return value;
}
}
/**Converts separators according to operating system
**/
private String replaceSeparators(String value){
String sep = File.separator;
if (sep.charAt(0) == '/')
    value = value.replace('\\', sep.charAt(0));
else
    value = value.replace('/', sep.charAt(0));
return value;
}
/** return replaced value to what it was before the
replacement*/
public boolean setValue(int fieldIndex,
```

COMPUTER PROGRAM LISTINGS

```
    String fieldValue) {
if (fieldIndex < 0 || fieldIndex >= recordSize)
    return false;
String pDir =
    session.getFrameworkProperty("parentDir");
if(fieldValue!=null && fieldValue.startsWith({
    String value = "(PARENT_DIR)" +
    fieldValue.substring(fieldValue.indexOf(pDir) +
    pDir.length( ));
    value = replaceSeparators(value);
    fieldValue = value;
}
values[fieldIndex] = fieldValue;
return true;
}
                    Listing 4

Platform platform =
  PlatformSessionManager.openPlatform(valueOf(parentDir) + name)
//administrator of the test system creates a new //platform
In the platform:
    TestSuitesManager.ReadRequest(test suites
        list of Record)
    //taken from the test suites directory
    EnvironmentView.ReadRequest(parameterslist of Record)
    SelectedView.ReadRequest(selected tests list of Record)
    //can be selected by the platform editor
for each request:
    Record[ ] records = XMLAccess.read(platformName)
                    Listing 5

Platform.open(fileName) →
    EnvironmentView/TestSuitesManager.init( );
BackupEnviornmentView/BackupTestSuitesManaget.init( )→
    Platform.save(fileName);
TestSuitesManager.save(BackupTestSuitesManager);
                    Listing 6 public void save (Record[ ] records)
{
    try
    {
        updateRecords(thisTable,backupTable);
        xmlAccessManager.dispatch(new
        WriteRequest(records, fileName));
    }
    catch(Exception e)
    {
        e.getMessage( );
        e.printStackTrace( );
    }
}
private void updateRecords(Table thisTable,Table
        restoreTable){
        Hashtable keys = thisTable.getKeys( );
        Enumeration enum = keys.keys( );
        while(enum.hasMoreElements( )){
        //for all the reords
            String key = (String)enum.nextElement( );
            Record oldRecord = restoreTable.searchRecord(key);
            //take record before the changes
            Record newRecord = thisTable.searchRecord(key);
            //take record after the changes
            if(oldRecord!=null && newRecord!=null){
                String oldValue =
                oldRecord.getValue(EnvironmentRecord.VALUE);
                //take the values
                String newValue =
                 newRecord.getValue(EnvironmentRecord.VALUE);
                if(oldValue!=null && newValue!=null){
                if(!newValue.equals(oldValue)){
                    //compare the values - if different update
                    // the counters
                    newRecord.setValue(newRecord.getFieldIndex
                        ("COUNTER"),
                    String.valueOf(Integer.parseInt
                        (newRecord.getValue
                        (EnvironmentRecord.COUNTER))+1));
                    newRecord.setValue(newRecord.getFieldIndex
                    ("MODIFIED"),"true");
                }
            }
        }
    }
                    Listing 7

PlatformSessionManager.open(platform)
//loads platform records
PlatformSessionManager.open(session) →
    EnvironmentView/TestSuitesManager.init( );
BackupEnviornmentView/BackupTestSuitesManaget.init( )
//create backup holders of the Records
Table.init(SessionRecords, PlatformsRecords)
//initialize Table with the records taken from the
//Platform and from the Session
for each Record
    Table.addRecord(SessionRecord, PlatformRecord)
    RecordAdder.add(SessionRecord, PlatformRecord)
    //class that takes care about the //updating/resolving
                    Listing 8 class RecordAdder
{
void addRecord(Record sessionRecord,Record
        platformRecord){
    String sessionCounter =
        sessionRecord.getValue(Record.COUNTER);
    int sCounter = Integer.parseInt(sessionCounter);
    //take Session's Record Counter
    String platformCounter =
        platformRecord.getValue(Record.COUNTER);
    int pCounter = Integer.parseInt(platformCounter);
    //take Platform's Record Counter
    String sessionModified =
        sessionRecord.getValue(TestSuiteRecord.MODIFIED);
    //true if Session Record was modified
    if(pCounter > sCounter)
        //if Platform's counter > Session's counter
        //then we should take value from the Platform, which
    // is the most updated
        autoReplace(sessionRecord,platformRecord);
    else if(pCounter==sCounter &&
     sessionModified.equalsIgnoreCase("true")){
        //if they are equal - then this is a conflict,
        // which the user should resolve
        AskUser(sessionRecord,platformRecord,key);
    }
    else
        //Session is more updated - leave the value as is
        table.addRecord(sessionRecord);
}
private void autoReplace(Record sessionRecord,
        Record platformRecord)
{
Record newRecord = new Record( );
newRecord.setValue(Record.MODIFIED,"true");
}
//clone values
for (int i = 0; i < newRecord.size( ); i++)
{
    newRecord.setValue(i, platformRecord.getValue(i));
}
//after the replacement add to the Table
table.addRecord(newRecord);
}
}
```

The invention claimed is:

1. A method for testing a plurality of computing products, the method comprising:

providing a central repository including data structures, said data structures comprising platforms, test suites, an execution test harness, and an installer;

downloading said installer to a plurality of clients of said central repository;

responsively to an execution of said installer in said clients, downloading and installing from said central repository selected ones of said platforms and said test suites to said clients for use by said clients in testing said computing products;

providing a platform editor for making a modification of at least one of said platforms, said test suites, and said execution test harness of said central repository, wherein said modification is automatically applied to all of said clients that are using said at least one of said platforms, said test suites, and said execution test harness.

2. The method according to claim 1, wherein said execution test harness is executed by said clients using binary files thereof residing on said central repository.

3. The method according to claim 1, wherein different selected ones of said platforms and said test suites are installed on different ones of said clients.

4. The method according to claim 3, wherein said different ones of said clients execute said test suites concurrently.

5. The method according to claim 3, wherein said different ones of said clients execute said test suites at different times.

6. A computer software product, comprising a computer-readable storage medium in which computer program instructions are stored, which instructions, when read by a computer, cause the computer to perform a method for testing a plurality of computing products, comprising:

defining a central repository including data structures, said data structures comprising platforms, test suites, an execution test harness, and an installer;

downloading said installer to a plurality of clients of said central repository;

responsively to an execution of a script generated by said installer in said clients, downloading selected ones of said platforms and said test suites to said clients for use by said clients in testing said computing products under control of said execution test harness;

defining a platform editor for modifying at least one of said platforms, said test suites, and said execution test harness of said central repository.

7. The computer software product according to claim 6, wherein said execution test harness is executed by said clients using binary files thereof residing on said central repository.

8. The computer software product according to claim 6, wherein different selected ones of said platforms and said test suites are installed on different ones of said clients.

9. The computer software product according to claim 8, wherein said different ones of said clients execute said test suites concurrently.

10. The computer software product according to claim 8, wherein said different ones of said clients execute said test suites at different times.

11. A test execution system for testing a plurality of computing products, comprising:

a central repository including data structures, said data structures comprising platforms, test suites, and an execution test harness;

an installer for downloading and installing selected ones of said platforms and said test suites at a plurality of clients of said central repository; and a platform editor for modifying at least one of said platforms, said test suites, and said execution test harness of said central repository.

12. The test execution system according to claim 11, wherein clients of said central repository execute said execution test harness using binary files residing on said central repository.

13. The test execution system according to claim 11, wherein different selected ones of said platforms and said test suites are installed on different ones of said clients.

14. The test execution system according to claim 13, wherein said different ones of said clients execute said test suites concurrently.

15. The test execution system according to claim 13, wherein said different ones of said clients execute said test suites at different times.

16. A method for testing a plurality of computing products, the method comprising:

providing a central repository including data structures, said data structures comprising platforms, test suites, an execution test harness, and an installer;

downloading said installer to a plurality of clients of said central repository;

responsively to an execution of a script generated by said installer in said clients, downloading selected ones of said platforms and said test suites to said clients for use by said clients in testing said computing products under control of said execution test harness; and defining a platform editor for modifying at least one of said platforms, said test suites, and said execution test harness of said central repository.

17. The method according to claim 16, wherein said execution test harness is executed by said clients using binary files thereof residing on said central repository.

18. The method according to claim 16, wherein different selected ones of said platforms and said test suites are installed on different ones of said clients.

19. The method according to claim 18, wherein said different ones of said clients execute said test suites concurrently.

20. The method according to claim 18, wherein said different ones of said clients execute said test suites at different times.

21. A computer software product, comprising a computer-readable storage medium in which computer program instructions are stored, which instructions, when read by a computer, cause the computer to perform a method for testing a plurality of computing products, comprising:

defining a central repository including data structures, said data structures comprising platforms, test suites, an execution test harness, and an installer;

downloading said installer to a plurality of clients of said central repository;

responsively to an execution of a script generated by said installer in said clients, downloading selected ones of said platforms and said test suites to said clients for use by said clients in testing said computing products under control of said execution test harness; and defining a platform editor for modifying at least one of said platforms, said test suites, and said execution test harness of said central repository.

22. The computer software product according to claim 21, wherein said execution test harness is executed by said clients using binary files thereof residing on said central repository.

23. The computer software product according to claim 21, wherein different selected ones of said platforms and said test suites are installed on different ones of said clients.

24. The computer software product according to claim 23, wherein said different ones of said clients execute said test suites concurrently.

25. The computer software product according to claim 23, wherein said different ones of said clients execute said test suites at different times.

* * * * *